US009338589B2

(12) United States Patent  
Loxam et al.

(10) Patent No.: US 9,338,589 B2
(45) Date of Patent: May 10, 2016

(54) USER-GENERATED CONTENT IN A VIRTUAL REALITY ENVIRONMENT

(71) Applicant: Hewlett-Packard Development Company, L.P., Houston, TX (US)

(72) Inventors: James Loxam, Cambridgeshire (GB); Sean Mark Blanchflower, Cambridge (GB)

(73) Assignee: Aurasma Limited, Bracknell (GB)

( * ) Notice: Subject to any disclaimer, the term of this patent is extended or adjusted under 35 U.S.C. 154(b) by 0 days.

(21) Appl. No.: 14/253,757

(22) Filed: Apr. 15, 2014

(65) Prior Publication Data

US 2014/0253743 A1 Sep. 11, 2014

Related U.S. Application Data

(63) Continuation of application No. 13/468,222, filed on May 10, 2012.

(51) Int. Cl.
| | |
|---|---|
| *H04W 4/02* | (2009.01) |
| *H04N 5/232* | (2006.01) |
| *G06T 11/00* | (2006.01) |
| *H04N 5/272* | (2006.01) |
| *G06K 9/00* | (2006.01) |
| *H04W 4/00* | (2009.01) |
| *H04W 4/18* | (2009.01) |

(52) U.S. Cl.
CPC .............. *H04W 4/02* (2013.01); *G06K 9/00671* (2013.01); *G06T 11/00* (2013.01); *H04N 5/232* (2013.01); *H04N 5/23206* (2013.01); *H04N 5/272* (2013.01); *H04W 4/00* (2013.01); *H04W 4/185* (2013.01)

(58) Field of Classification Search
None
See application file for complete search history.

(56) References Cited

U.S. PATENT DOCUMENTS

| | | | |
|---|---|---|---|
| 6,845,338 | B1 | 1/2005 | Willins et al. |
| 7,050,787 | B2 | 5/2006 | Caci |
| 7,084,809 | B2 | 8/2006 | Hockley et al. |
| 7,177,651 | B1 | 2/2007 | Almassy |
| 7,389,526 | B1 | 6/2008 | Chang et al. |
| 8,005,958 | B2 | 8/2011 | Hannel et al. |
| 2004/0258311 | A1 | 12/2004 | Barbehoen et al. |
| 2005/0055281 | A1 | 3/2005 | Williams |
| 2005/0227674 | A1 | 10/2005 | Kopra et al. |

(Continued)

FOREIGN PATENT DOCUMENTS

GB 2436924 10/2007

OTHER PUBLICATIONS

Autonomy PR, "Thrasher Magazine and Aurasma Launch Comprehensive Augmented Reality Promotion for SXSW and Beyond", http://www.autonomy.com/content/News/Releases/2012, 2 pages.

(Continued)

*Primary Examiner* — Mark Zimmerman
*Assistant Examiner* — Vu Nguyen
(74) *Attorney, Agent, or Firm* — HP Inc. Patent Department

(57) ABSTRACT

The systems and methods allow users of mobile computing devices to generate augmented reality scenarios. Augmented reality content is paired with a real world trigger item to generate the augmented reality scenario. The augmented reality content is overlaid onto frames on a video when a trigger item is detected. Each mobile computing device may have an augmented reality application resident on the mobile computing device to allow a user to generate the augmented reality scenarios.

17 Claims, 10 Drawing Sheets

(56) References Cited

U.S. PATENT DOCUMENTS

| | | |
|---|---|---|
| 2006/0218191 A1 | 9/2006 | Gopalakrishnan |
| 2006/0227992 A1 | 10/2006 | Rathus et al. |
| 2007/0161383 A1 | 7/2007 | Caci |
| 2008/0077952 A1 | 3/2008 | St. Jean et al. |
| 2008/0165843 A1 | 7/2008 | Dvir et al. |
| 2008/0174570 A1* | 7/2008 | Jobs et al. ............... 345/173 |
| 2008/0188246 A1 | 8/2008 | Sheha et al. |
| 2008/0214153 A1 | 9/2008 | Ramer et al. |
| 2008/0268876 A1 | 10/2008 | Gelfand et al. |
| 2008/0298689 A1* | 12/2008 | Ashbrook ......... G06F 17/30265 382/224 |
| 2009/0061901 A1 | 3/2009 | Arrasvuori et al. |
| 2009/0070797 A1 | 3/2009 | Ramaswamy et al. |
| 2009/0102859 A1 | 4/2009 | Athsani et al. |
| 2009/0141984 A1* | 6/2009 | Nakamura et al. ........... 382/201 |
| 2009/0176520 A1 | 7/2009 | B. S. et al. |
| 2009/0232354 A1 | 9/2009 | Camp, Jr. et al. |
| 2009/0233629 A1 | 9/2009 | Jayanthi |
| 2009/0276154 A1 | 11/2009 | Subramanian et al. |
| 2009/0307091 A1 | 12/2009 | Lilley |
| 2010/0081458 A1 | 4/2010 | Sheynblat et al. |
| 2010/0103241 A1 | 4/2010 | Linaker et al. |
| 2010/0115114 A1 | 5/2010 | Headley |
| 2010/0194782 A1* | 8/2010 | Gyorfi et al. .................. 345/633 |
| 2010/0309225 A1 | 12/2010 | Gray et al. |
| 2010/0325126 A1 | 12/2010 | Rajaram et al. |
| 2011/0090252 A1* | 4/2011 | Yoon et al. ................... 345/633 |
| 2011/0135207 A1* | 6/2011 | Flynn et al. .................. 382/209 |
| 2011/0210959 A1 | 9/2011 | Howard et al. |
| 2011/0223931 A1 | 9/2011 | Buer et al. |
| 2012/0207352 A1* | 8/2012 | Boncyk et al. ............... 382/103 |

OTHER PUBLICATIONS

Marks, Paul, "Aurasma App Is Augmented Reality, Augmented", newscientist.com, http://www.newscientist.com/blogs/onepercent/2011/05/how-the-reverend-bayes-will-fi.html, May 20.

* cited by examiner

USER-GENERATED CONTENT IN A VIRTUAL REALITY ENVIRONMENT

RELATED APPLICATIONS

The present application is a Continuation of U.S. patent application Ser. No. 13/468,222, filed May 10, 2012, titled, "USER-GENERATED CONTENT IN A VIRTUAL REALITY ENVIRONMENT FIELD;" the disclosure of which is incorporated herein by reference in its entirety.

TECHNICAL FIELD

Embodiments of the present disclosure generally relate to the field of digital image processing, and in some embodiments, specifically relate to inserting augmented reality content into one or more frames of a video.

BACKGROUND

Various types of video capturing devices are available in the market today at very affordable prices. This allows many consumers the ability to capture video for any occasions at any place and any time. Typically, the content of the captured video is limited to what is visible to the operator of the video capture device. For example, when the operator is videotaping a building because of its unique architecture, what the operator sees in a viewfinder or on a display of the video capturing device are images of the same building and nothing more.

BRIEF DESCRIPTION OF THE DRAWINGS

The multiple drawings refer to embodiments of the disclosure. While embodiments of the disclosure described herein are subject to various modifications and alternative forms, specific embodiments thereof have been shown by way of example in the drawings and will herein be described in detail.

DETAILED DESCRIPTION

Figure 1:
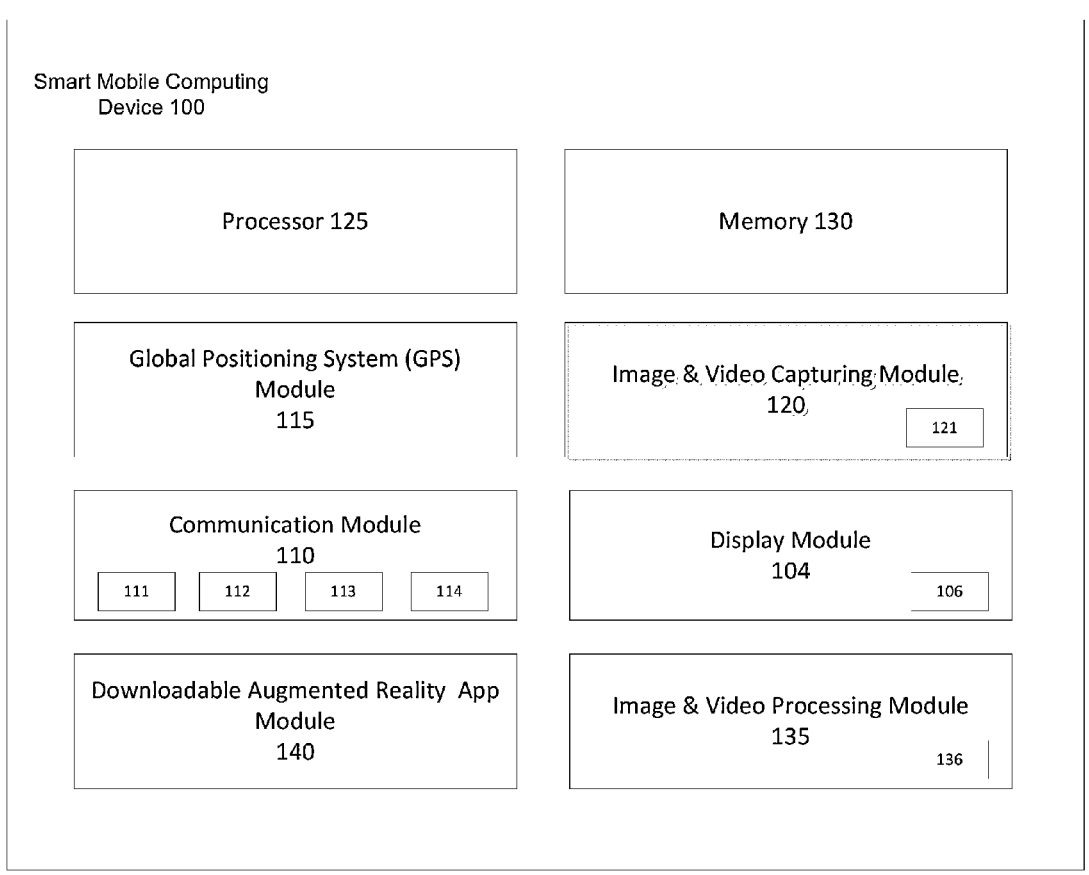
FIG. 1 illustrates a block diagram of an embodiment of an example of a mobile computing device having an augmented reality application resident.

In the following description, numerous specific details are set forth, such as examples of specific data signals, components, types of augmented reality scenarios, etc. in order to provide a thorough understanding of the present disclosure. It will be apparent, however, to one skilled in the art that the present disclosure may be practiced without these specific details. In other instances, well known components or methods have not been described in detail but rather in a block diagram in order to avoid unnecessarily obscuring the present disclosure. Thus, the specific details set forth are merely exemplary. The specific details may be varied from and still be contemplated to be within the spirit and scope of the present disclosure.

The systems and methods described here may allow users to generate augmented reality scenarios. Each user of a mobile computing device has an augmented reality application resident on the mobile computing device that allows a user to generate the augmented reality scenarios. The augmented reality application may walk a user through a number of operations to create the augmented reality scenario. The augmented reality application guides a user to 1) select and/or 2) upload augmented reality content to include as part of the augmented reality scenario. The augmented reality application guides a user to 1) select and/or 2) upload a real world trigger item for activating the augmented reality scenario. The augmented-reality application pairs the augmented reality content with the real world trigger item. Upon a trigger detection engine in the augmented reality application detecting the real world trigger item from a video captured by a video camera of the mobile computing device, then an augmentation engine of the augmented reality application is configured to overlay the augmented reality content onto frames of the video for presentation on a display. The augmented reality application guides a user to submit the augmented reality scenario, by uploading it over a network, to a backend server system that cooperates with multiple instances of the augmented reality application. The multiple instances of the augmented reality application are generally resident on different mobile computing devices.

The augmented reality scenario can be user-generated and uploaded by the user to a database. In this way, the user-generated content can be created and published to be shared with friends or the rest of the world. For example, a user can start viewing and creating augmented reality scenarios, which enable the user to overlay augmented reality content including video files, audio files, animations, games, links to sites, or other types of interactions over all sorts of images in the real world. The user can use the step-by-step built-in wizard/instructions in the downloaded augmented reality application to create augmented reality actions that appear when the user or the user's friends hover their smart phone over the real world trigger item. The user can also then share their augmented reality scenarios with others in many ways.

Mobile Computing Device to Generate Augmented Reality Video Streams

FIG. 1 illustrates a block diagram of an embodiment of an example of a mobile computing device having the download augmented reality application resident. Mobile computing device 100 may include display module 104, communication module 110, global positioning system (GPS) module 115, image and video capturing module 120, processor 125, memory 130, image and video processing module 135, and one or more downloaded applications including the augmented reality application 140. The mobile computing device 100 may be, for example, a smart cellular phone, a laptop, a notebook, a touch pad, or any other similar devices. The mobile computing device 100 cooperates with the network 200 (see FIGS. 2, 3, 4, and 9). The augmented reality application 140 uses the video processing, displaying, and capturing functionality of the mobile computing device 100 to assist in the identification of objects captured in each video frame as well as then an augmentation engine from the application inserts the augmented reality content into the frames of the video stream.

Network Environment between the Mobile Computing Devices and the Servers

Figure 2:
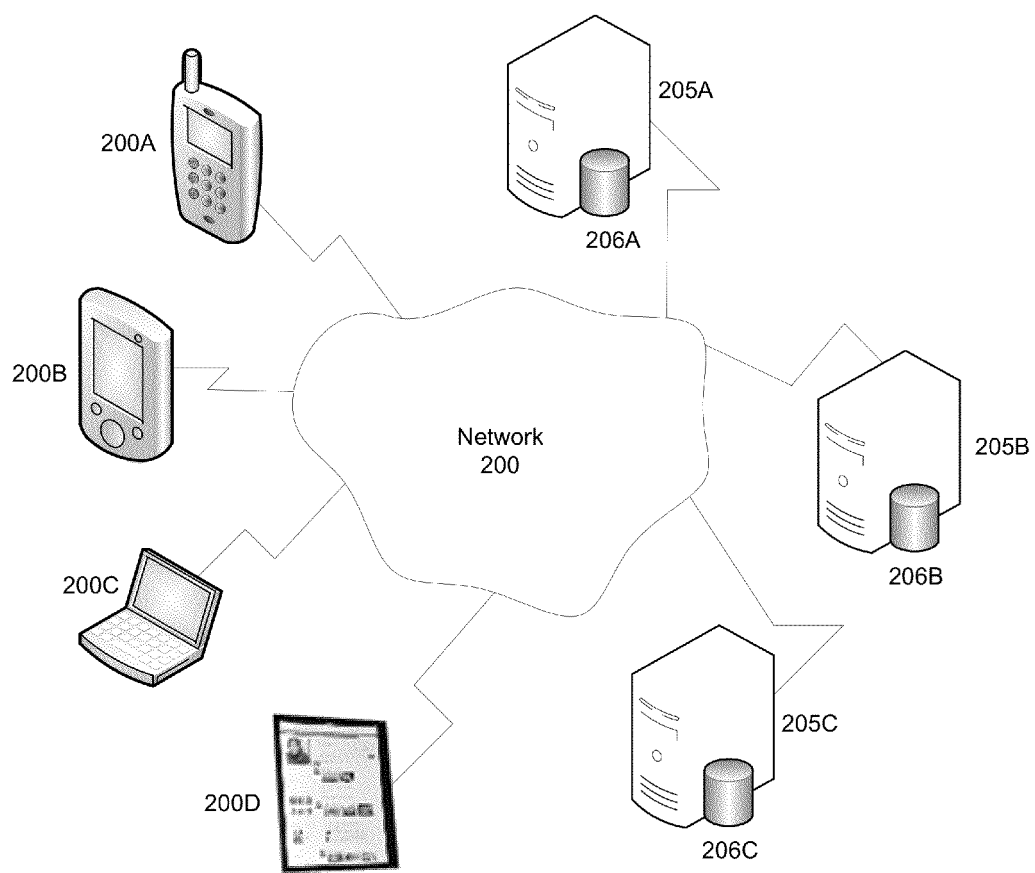
FIG. 2 illustrates a block diagram of an embodiment of an example network that may be used to add augmented reality scenarios to a captured video stream.

FIG. 2 illustrates a block diagram of an embodiment of an example network that may be used to add in augmented reality scenarios into a captured video stream. Network 200 may be the Internet. Multiple servers 205A-205C and multiple mobile computing devices 200A-200D may be connected to the network 200. Each of the servers 205A-205C may be associated with a database 206A-206C, respectively. The mobile computing devices 200A-200D may be referred to as the mobile computing devices.

Figure 3:
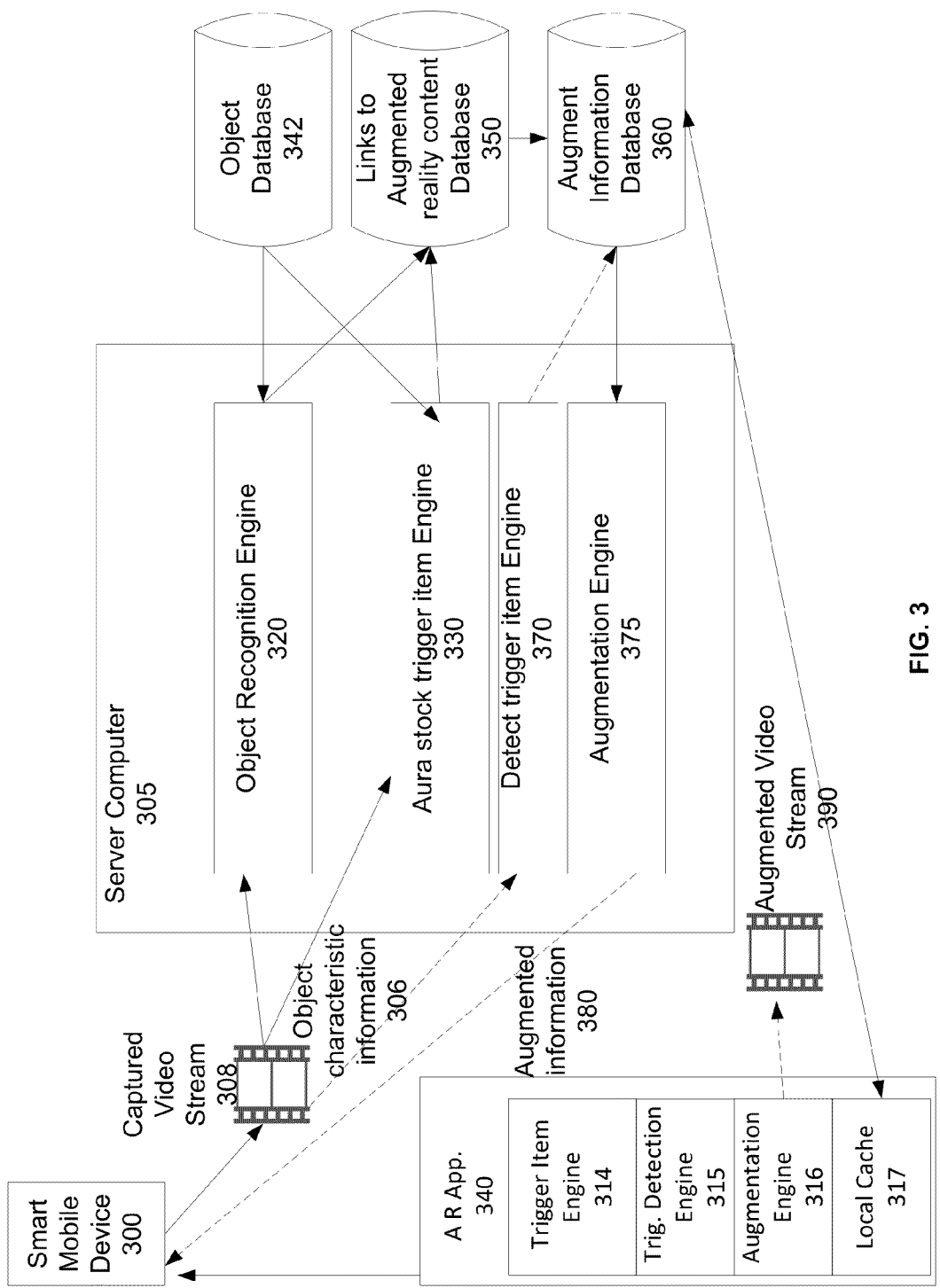
FIG. 3 illustrates a block diagram of an embodiment of an example downloaded augmented reality application resident in a mobile computing device cooperating with a server system connected over a wide area network to determine augmented reality information to be used with a captured video stream.

FIG. 3 illustrates a block diagram of an embodiment of an example downloaded augmented reality application resident in a mobile computing device cooperating with a server system connected over wide area network to determine what augmented reality information is to be used with a captured video stream. The smart mobile computing device 300 can include the downloadable augmented reality application 340. The augmented reality application has one or more routines to guide users on how to create their own augmented reality scenarios and then share those augmented reality scenarios with other instances of the augmented reality application. The augmented reality application 340 may include multiple modules/engines, such as a stock trigger item engine 314, a trigger detection engine 315, an augmentation engine 316, a local cache 317 and other similar engines and modules. These generally perform the same or similar functions as the corresponding component resident in the server system 305, or database 342, 350, 360 attached to the server system 305, as appropriate. For example, the trigger item engine 314 corresponds to the stock trigger item engine 330 and performs the same or similar functionality. Generally, however, this functionality would be performed for the instance of the augmented reality application on the specific smart mobile computing device 300 and potentially merely have a subset of the full capabilities of the similar components found in the backend server system 305. Also, at the server system 305, the functionality is generally configured to be performed for multiple instances of the application potentially at the same time.

The trigger item engine 314 may be configured to index and store characteristics and geographical information associated with potential trigger item objects. The trigger item objects may include any combination of 1) pre-determined stock objects and images maintained by an object database 342 in the backend server system 305, 2) custom objects and images selected and created by a user of this instance of the augmented reality application to be used as a trigger item, or 3) both.

The trigger detection engine 315 detects trigger items in a video stream at the mobile device 300. The trigger detection engine 315 identifies images and objects included in a video stream that trigger the generation of augmented reality actions and overlays. The trigger detection engine 315 can be configured to compare current characteristics and meta data information of images and objects found in or associated with one or more frames in a first set of frames of a video stream compared to the characteristics and meta data information stored in the trigger item engine 314 in order to identify a known trigger item. The trigger detection engine 315 is configured to process images and/or video streams captured by the video capturing module 120. The trigger detection engine 315 may analyze the frames of the captured video stream and identify the objects/potential trigger item within each frame of the captured video stream. Identifying the points of interest for an object may include breaking the object into geometric shapes and distinctive features. The operations may apply to a set of objects with each object in the set broken down into different geometric shapes and associated distinctive features.

As discussed herein, recognition of trigger items may occur in a scalable way of combining two or more data sources including using the visual, audio, and Optical Character Recognition information as well as the geographical location, angle of the image, and other meta data. Information presented by video streams is typically limited to what is visible or audible to the users such as geometric shapes, colors patterns associated with that shape, symbols and other features associated with objects in that video stream. Combining the visual information and the metadata of an image or object, such as geographical information, may allow a rapid recognition or matching to the characteristics of objects that are known and pre-stored in an object database 342. The geographical information may be provided by a global positioning system (GPS) built-into the mobile computing device. Combining the visual information with the metadata of an image or object generally reduces the amount of possible trigger items that need to be sorted through by the object recognition engine 320 and trigger detection engine 315 to identify and recognize known objects and/or persons. For example, the rough geographical information from the GPS reduces the amount of possible trigger items that need to be sorted through as a possible match to known objects in that area. Further, direction information about where a video camera of the mobile computing device is facing when capturing the video stream is also transmitted to the server system connected over wide area network. The direction information may be provided by a built-in compass or direction sensor in the mobile computing device to the backend server system along with the features of the potential trigger item in that frame. The audio augmented reality information may be audible through the speaker of the mobile computing device 300. All of these points are analyzed by the trigger detection engine 315 on the mobile computing device 300, which attempts to identify the major features of one or more potential trigger item within each frame of a video stream captured by the video camera, and also transmits those identified features and points of interest to the server system 305. All of these features and points of information assist in reducing the sheer number of potential views to compare the characteristics information transmitted from the mobile computing device to known objects stored in a database, which makes a scalable and manageable system.

The trigger detection engine 315 may use an extraction algorithm to identify the distinctive features of the potential trigger item in a frame and extract those features, along with the geographical information, and other relevant information. The trigger detection engine 315 then analyzes those distinctive features locally or potentially transmits that packet of information about that frame up to the server system 305, for each frame being captured by the video camera. The trigger detection engine 315 may generate a pattern of X-Y coordinates of the geometric shapes of the potential trigger item as well as the color associated with the shapes. The trigger detection engine 315 attempts to match the pattern of the visually distinctive features of the potential trigger item in the frame to the known objects in the object database. The geometric shape of the features of the point of interest X-Y coordinates may come across to a human like a dot-to-dot connection illustration. When the X-Y coordinates of the dots on the grid of the paper are connected in the proper sequence, recognizing the image/object associated with those dots on the piece of paper is a simple task. This may include comparing the dot-to-dot type geometric shapes transmitted features along with their distinctive colors, recognized text, numbers and symbols, geographical information, direction information relative to the camera to the feature sets stored in the object database 340. The dot-to-dot type geometric shapes can be broken into distinctive triangles, pyramids, rectangles, cubes, circles and cylinders, etc., each with its own associated distinctive colors or patterns, to aid in the identification and recognition. The trigger item engine 314, like the stock trigger item engine 330 in the server system 305, on a hierarchical basis, may map the collection of feature points about the potential trigger item to a stored pattern of feature points for known trigger item objects to match what is in the frames to the known object. The trigger detection engine 315 may cooperate with the trigger item engine 314 to hierarchically filter or narrow down the possible known matching images/object to the transmitted features.

The trigger detection engine 315 may perform basic scene analysis including using optical character recognition (OCR) to extract the distinctive features of the potential trigger item within the frames of the captured video stream, code them into the small pattern of X-Y coordinates for geometric shape format with associated distinctive color and pattern information for that feature. The trigger detection engine 315 generally identifies the geographical information of that object and other known distinctive features for that object.

For some embodiments, the potential trigger items in a frame may be related to a person. The trigger detection engine 315 may be configured to analyze the frames of the captured video stream and identify facial characteristics or visual information of a person that may be in the center area of the frames. In some embodiments, the trigger detection engine 315 performs the facial analysis entirely locally. For some embodiments, as the video scene is being captured by the mobile computing device 300, the video stream is transmitted to the server system 305 and analyzed by the server system 305 for facial recognition. Alternatively, the identity of the desired user is transmitted to the server system 305 and the images and different views are transmitted to the mobile computing device. Thus, the server system 305 stores the photos for facial recognition in the facial recognition database and transmits to the mobile computing device 300 the facial recognition image or set of images (e.g., front side, right side, and left side profile). The trigger-detection engine 315 makes the facial recognition faster and easier by the trigger-detection engine of the mobile computing device 300 by storing merely the relevant set of images for this particular instance of the application. One or more types of rapid facial recognition software, which look at features such as skin tone, and facial features such as eyes may be incorporated into the trigger detection engine 315.

Meta data associated with the image is very helpful as well. The trigger detection engine 315 may extract the direction information from a compass and/or direction sensor associated with the video camera to determine the direction that the video camera is facing when capturing the frames in the video stream. The direction information provided by the direction sensor may include North, South, East, West, upward angle, downward angle, and any possible related combinations (e.g., Northwest and up 20 degrees from a horizontal plane, etc.). For some embodiments, the pattern of points used for the potential trigger items, the amount of points used, and the amounts of points of interest may be dependent on the amount of distinct potential trigger item in the frame. Non-centered or periphery objects in the frame, small objects, and non-distinctive objects can be filtered out by the extraction algorithm, while only bold and distinctive features on the potential trigger item may be extracted.

The trigger detection engine 315 analyzes each captured frame and their relation to each other in the video stream. The trigger detection engine 315 may relate patterns from the series of frames to assist in determining what the potential trigger items are and whether they are known to the system. The trigger detection engine 315 will initially try to match the distinct points and objects to those known in the trigger item engine 314. However, trigger detection engine 315 can also use the backend server to assist in detecting trigger items or in the creation of a new trigger item. The trigger detection engine 315 may relate patterns from the series of frames to enable faster transmission or even local analysis of the features of the potential trigger item. For some embodiments, no transmission of the features from a particular frame may be necessary if there is no change to the same features that were previously transmitted. For some embodiments, if a current frame includes features that are different from the previous frame, only the difference in the change of features is transmitted.

For some embodiments, the objects/potential trigger items may generally be located in the center area of the frames. It may be noted that certain consecutive frames of the captured video stream may have the same object in the center area or at least contained within the series of consecutive frames. The video processing module may analyze these frames to identify the characteristics or visual information of the object. As the video capturing module continues to capture the video stream, it may be possible that the trigger detection engine 315 will identify many different objects.

The downloadable augmented reality application 312 brings the physical and virtual worlds together. The downloadable augmented reality application is capable of recognizing trigger items such as images, symbols, and objects in the real world and understanding them. Using the smart phone's camera, GPS, compass, accelerometer and internet connection, the technology combines image recognition and a conceptual understanding of the 3D world to recognize objects and images and seamlessly merge augmented reality actions into the scene. Without the need for barcodes or tags on potential trigger items, the augmented reality application is able to see the trigger items and their surrounding environment and make it fully interactive. For example, the trigger detection engine 315 may recognize the distinctive features and the point of interest for a billboard or poster for a movie, a restaurant such as McDonalds, a building such as an office, historic landmark, residence, etc.

These trigger items cause the downloadable augmented reality application to then deliver relevant content including augmented reality overlays in real time, including videos, animations, audio, or web pages.

The above operations performed by the trigger detection engine 315 can be used to minimize the size of the file being transmitted to the server, and hasten the near real time recognition by the server system of the potential trigger item, and achieve near real time transmitting the augmented reality information to the mobile computing device 300. Rather than trying to transmit a JPEG or MPEG type file, the trigger detection engine 315 identifies and extracts distinctive features including shapes, dot-to-dot type X-Y coordinates of the shapes, patterns colors, letters numbers, symbols, etc. associated with objects/potential trigger item in the video frame. Alternatively, breaking down these distinctive features including shapes, dot-to-dot type X-Y coordinates of the shapes, patterns colors, letters numbers, symbols, etc. allows hierarchal filtering of possible matching trigger items to allow a quicker analysis locally between the trigger item engine 314 and trigger detection engine 315. As transmission speeds increase, entire images may be transmitted on a continuous basis to the server system 305. Other techniques that may be used to reduce the amount of information transmitted between the mobile computing device 300 and the server system 305 may include transmitting the color images in black and white, transmitting in gray scale, transmitting reduced dots per inch (DPI) images, etc.

The trigger detection engine 315 may include a compress-decompress (codec) module. For some embodiments, the codec may compress the captured video stream into a DivX format. DivX is a video compression technology developed by DivX, LLC of San Diego, Calif. The DivX format may enable users to quickly play and create high-quality video streams. DivX codec is a popular Moving Picture Experts Group-4 (MPEG-4) based codec because of its quality, speed, and efficiency. As a DivX codec, the codec may enable the captured video streams and/or the identified features or characteristics information of the objects/potential trigger item to be quickly transmitted to a server system 305 where the communication bandwidth may be limited (e.g., wireless communication). Other techniques that enable fast transmission of information from the mobile computing device to a server system 305 may also be used. For example, instead of transmitting an image or a captured video stream in its original color, a conversion may be performed to convert the image or the captured video stream from color to black and white to reduce the size of the information to be transferred.

Accordingly, the trigger detection engine 315 monitoring the video stream from a video camera of the mobile computing device detects the real world trigger item by comparing objects in the video stream to known trigger items stored in 1) a database communicatively connected to the mobile computing device over a network, 2) a local cache in the mobile computing device and 3) any combination of the two. The associated augmented reality content and actions are pulled from 1) a database communicatively connected to the mobile computing device over a network, 2) a local cache in the mobile computing device and 3) any combination of the two. The augmentation engine then overlays the augmented reality content onto the video stream being displayed on a display screen of the mobile computing device.

The augmentation engine 316 provides the augmented reality content to overlay onto the frames of the video stream in the mobile device 300 similar to augmentation engine 375 in the server system 305. The augmented reality information is to be overlaid as well as sized, scaled, and positioned relative to the trigger item. The overlaying includes initially merely putting a highlight on the trigger item so that the user can then activate the highlighted item to view and/or hear the augmented reality information overlaid with the captured video stream. The augmentation engine 316, like augmentation engine 375, can be coupled with the augment information database 360, of which database a portion is stored in the local cache 315 in the mobile device 300. The augmentation engine 316 is also configured to allow a user to create augmented reality content from stock locations including any combination of 1) off of the local memory of the smart mobile computing device 300, 2) from Internet sources, 3) from an augment information database 360 maintained at the backend server, 4) from a links database 350, or 5) similar source. The augmentation engine 316 then also allows the user to associate that augmented reality content with at least one trigger item from the trigger item engine 314/330.

The local cache 317 provides a dedicated local storage area on the mobile computing device 300 that is used to replicate portions of the various databases 342, 350, 360 maintained at the backend server system. Such information includes known trigger item information and augmented reality content information, and the cache storage space is for sole use by the augmented reality application 340 in the mobile computing device 300. Thus, the local cache 317 can be coupled with the trigger item engine 314 and configured to store augmented reality content and information associated with the known trigger items.

Server system 305 may include a communication module to allow it to be connected to a network such as the network 200 illustrated in FIG. 2. The server system 305 may also include server applications that allow it to communicate with one or more mobile computing devices including, for example, the smart mobile computing device 300. Communication sessions may be established between the server system 305 and each instance of the downloaded augmented reality application resident in its own mobile computing device 300 to enable the receipt of the augmented reality related information 306 from the mobile computing device 300, and to conduct the transmission of the augmented reality information 390 to the mobile computing device 300. For some embodiments, the server system 305 may be coupled with object database 342, augmented content links database 350, and augment information database 360. Backend server system 305 may include two or more servers cooperating and distributing the work amongst that set of servers at that site to achieve that backend server's function in a faster manner. The mirroring of sites with identical compositions of hardware and content is done to help to improve the identification and augmentation response time. Also, in addition mirroring of identical server site locations aids in servicing potentially millions of mobile computing devices with the video application resident all submitting packets with distinguishing features for the trigger items and augmented reality content by distributing the workload and limiting the physical transmission distance and associated time.

For some embodiments, the server system 305 may include an object recognition engine 320, a trigger item engine 330, a detect trigger item engine 370, an object database 342, a links database 350, an augmented reality information database 360, and an augmentation engine 375.

As discussed earlier, the trigger detection engine 315 of the augmented reality application on the client mobile computing device uses an extraction algorithm to identify the features of the potential trigger item in that frame, extracts those features along with data such as geographical information, compass direction, and other relevant information, and attempts to identify those characteristics to a known trigger item. Most of the time, the augmented reality application will be able to identify trigger items and pair augmented reality content to those trigger items all by itself. When the object is unknown to the downloadable application, then it may transmit that packet of information about that object up to the backend server. The backend server system has the expansive knowledge databases 342, 350, 360 and distributed computing power in the object recognition engine 320 and the detect trigger item engine 370 to identify the characteristics of any points of interest for target object/target image and index them to make a known trigger item. The backend server system can analyze the series of frames coming in the video stream, and use this information to match the transmitted features of the potential trigger item to known objects or images in the database 340 in a similar manner as discussed for the trigger detection engine 315.

A few additional points include that the object recognition engine 320 in the server is configured to take advantage of distributed workload computing across multiple servers to increase the speed of filtering out candidate known images stored in the object database 342 compared to the characteristics information transmitted by the mobile computing device. The servers take advantage of distributed computing among the set of servers, as well as the benefits of an intelligence engine that contextually making a nexus between various concepts, and mirroring of hardware and content to achieve near real time identifying trigger items captured in a video stream with augmented content. (See FIGS. 4 and 9 for a more detailed discussion on mirroring.) The mobile computing device captures the video stream and the patterns are transmitted by using wireless communication. The visually distinctive features included in the frames are then initially compared with visually distinctive features of known target items included in an object database to identify a known trigger item. The comparison is performed by object recognition engine 320 applying a hierarchical set of filters spread linearly across a set of two or more server computers connected to the network. Each object recognition engine 320 can work on filtering through different distinctive features of the potential trigger item, with each object recognition engine 320 starting with a different distinctive feature. The object recognition engine 320 may also use the geographical information included in the frames of the captured video stream 308 and the information stored in the object database 342 to recognize the target objects. For example, a yellow building with the pyramid shape located at latitude coordinate X and longitude coordinate Y may be recognized as the National Financial Building. The object recognition engine 320 applies a set of filters to the meta data, characteristics, and visual information received from the mobile computing device 300 to determine whether it can recognize what the target object or who the person is. Since the captured video stream 308 is comprised of a series of closely related frames both in time and in approximate location, the frames generally include the same objects and/or persons and the characteristics/visual information. The frames then present multiple views of the same pattern of identified major features of the object (or the potential trigger item). This may also help the object recognition engine 320 to narrow down the matching options that are available in the object database 342 by getting a more complete understanding of the potential trigger item. For example, the object recognition engine 320 may recognize the distinctive features and the points of interest for a restaurant such as McDonalds because the series of frames make it clear that a yellow M appears in front of the building.

Next, the augmentation engine 375 can start transmitting to the mobile computing device 300 the potential large augmented reality content files such as video files, and advertisements while the object recognition engine 320 determines what object is. Thus, at approximately at the same time as the object recognition engine 320 is hierarchically filtering or narrowing down the possible known matching images/object to the transmitted features, the augmentation engine 375 can be preparing and selecting augmented reality content to be transmitted back to the video processing module on the mobile computing device 300 for display. Note, similarly augmentation engine 316 can be preparing and selecting augmented reality content to be overlaid onto the video frames while the trigger item identification is going on. Note, the local cache 317 assists in performance in that it maintains a large portion of the augmented reality content most relevant to this user on the mobile device eliminating the need to transmit augmented reality content. As discussed, the local cache 317 may maintain a portion of the known trigger items most relevant to this user on the mobile device eliminating the need to transmit potential trigger items to the backend server. Nonetheless, the augmentation engine 375 on the server can start transmitting the video files, and advertisements and images, textual messages, links to relevant web pages, etc. to supplement the content stored in the local cache. The backend server system may also periodically deliver the user-generated augmented reality scenarios stored in the back end server system to each augmented reality application resident on its own mobile computing device, such as smart mobile device 300 based on a channel subscription basis as will be discussed in more detail later.

The augmentation engine 316 then overlays the augmented reality information onto the frames of the video stream. The video processing module then plays the video file with the augmented reality content on the display. The user can choose to activate the highlighted trigger item to view the augmented reality information associated with the frames of the video file being displayed on the display screen 106 of the mobile computing device 300.

The augmentation engine 375 cooperates with the augment information database 360 that stores the augmented reality content (e.g., video files, advertisements, links, etc.) to overlay onto objects in the frames. The augmentation engine 375 may be configured to receive the results from either the object recognition engine 320 or the trigger detection engine 370. This will determine how to select the proper augmented reality information to be transmitted to the mobile computing device 300 to augment the identified object in the original video file, and select that augmented reality information 380 from the augment information database 360. The augmented reality information 380 may be related to the objects or persons that have been recognized by the object recognition engine 320. Accordingly, the augmented reality information 380 may include in-depth information or content about the objects and/or persons included in the frames of the captured video stream 308. For example, the augmented reality information 380 may include listing of food establishments in various buildings, links to user reviews for a particular business, links to web pages, etc. The augmentation engine 375 may select the augmented reality information that is most relevant to the user. For example, the object may be an office building with many different businesses, and the object database 330 may include augmented reality information associated with each of the businesses. However, only the augmented reality information associated with an art gallery may be selected because the profile of the user or the operator of the mobile computing device 300 may indicate that the user is only interested in modern arts.

Next, the object database 342 may be configured to store information about a group of known objects. The information may describe the different characteristics including visual, audio, textual, and metadata of the known objects. This may include geographical information, color information, pattern information, and so on. In general, the characteristics of the object may include any information about the object that may be useful to identify the object and recognize it as a known object. For example, an office building located on the corner of Fourth Street and Broadway Avenue in downtown San Francisco may be identified based on its unique pyramid shape architecture and orange color. Many techniques may be used to generate the information about the objects. For example, the information may be generated by human, or it may be generated by a special computer application coded to scan a color image and generate a list of objects included in the image along with their characteristics.

For some embodiments, the augment information database 360 stores a master composite of the augmented reality content and any other information from all of the different source depositories that may be inserted into the captured video stream 308. The information may include identification information (e.g., the university), advertisement information (e.g., restaurant discount coupons), link information (e.g., a URL link to the website of a restaurant), facial information (e.g., Bob Smith), etc. Different types of augmented reality information may be stored for the same object. The augmented reality content along with advertisements may be transmitted to the mobile computing device.

Back End Server Publishes the Augmented Reality Scenarios

The augmentation engine 375 also allows a user to publish and share their own augmented reality scenario and see those created by others. For example, if the user were looking at an article about a new Ferrari®, the user's smart phone will make the Ferrari come alive by playing footage of the supercar in action. Thus, augmented reality scenarios have content—such as a photo or video overlaid on a static image, or an animation overlaid on a cereal box.

Next, the backend server stores both types of augmented reality scenarios—normal and location-based.

There is also a special type of augmented reality scenario the user can create called location-based augmented reality scenarios. Location-based augmented reality scenarios are augmented reality scenarios that appear in one or more specific geographical locations. The augmented reality application is configured that when it detects that the Global Position System of the mobile computing device indicates coordinates that are near by the one or more specific geographic locations of location-based augmented reality scenarios, the augmented reality application causes an icon to appear on a display on the mobile computing device indicating a direction and how far away the geographic location of the mobile computing device is relative to a geographic location of the location-based augmented reality scenario that is located nearby. The icon indicating a direction to a geographic location of the augmented reality scenario may be a thumbnail at the bottom of the display screen. The user can select the icon and look at the map to search for location-based augmented reality scenarios. Friends of the user can leave the user a video greeting that appears on the front of their house, or perhaps a series of hidden messages dotted around the city as part of a treasure hunt. Thus, a location-based augmented reality scenario is an augmented reality scenario that exists at a specific place in the real world. This could be a pterodactyl flying round the Empire State Building, or a 'Happy Birthday' banner draped over the front of your house.

Coded applications in the mobile computing device enable calculation of the distance to another location-based user-generated augmented reality scenario. The coded applications generate approximate direction of the other user by text indicating direction and distance. The coded application may insert an arrow in a video file playing on the mobile computing device to indicate the direction that the user should walk to get to the location-based user-generated augmented reality scenario. For some embodiments, the mobile computing device 300 may include a distance-processing module that coordinates with the GPS of the mobile computing device to process this information.

The backend server system may publish both the third-party-generated and user-generated augmented reality scenarios stored in the one or more channels in the databases 342, 350, 360. The back end server also may create and publish an interest group around a category of created augmented reality scenarios including user-created augmented reality scenarios and selected third party augmented reality scenarios in order to share to those augmented reality scenarios to all those instances of the downloadable augmented reality application, where either 1) users subscribe to that interest group or 2) the user's behavior including any combination of browser history, other downloaded applications on the mobile device indicates that the user would be interested in that category of created augmented reality scenarios.

A user may actively download published augmented reality scenarios from their instance of the augmented reality application 314. In addition, the server system connected over wide area network may periodically automatically push the user-generated augmented reality scenarios by transmitting them over a network to each instance of the augmented reality application that subscribes to that channel. As discussed, the augmentation engine 375 transmits the augmented information stream that includes the augmented reality scenario to the one or more instances of augmented reality application.

The selected augmented reality scenarios that have been transmitted to the mobile computing device 300 and potentially stored in the local cache 317 are used by the augmentation engine 316 to generate the augmented video stream 390. The augmented video stream 390 may then be viewed by the user or used by any other applications that may exist on the mobile computing device 300. It is within the scope of the embodiments of the disclosure that the operations of capturing the video stream, processing the captured video stream, recognizing object and/or persons in the captured video stream, augmenting the captured video stream, and presenting the augmented video stream to the user or the other applications occur in real time. For example, the user may capture a video stream 308 and almost instantaneously see the augmented video stream 390 displayed on the display screen 106 of the mobile computing device 300.

For some embodiments, the server 300 may be implemented as an Intelligent Data Operating Layer (IDOL) server using the IDOL software product and associated system of Autonomy Corporation of San Francisco, Calif. See FIG. 7.

Referring back to FIG. 1, the communication module 110 may be used to allow the mobile computing device 100 to be connected to a network such as, for example, the network 200 (see FIG. 2). The communication module 110 may be configured to enable the mobile computing device 100 to connect to the network 200 using wireless communication protocol or any other suitable communication protocols. For example, the communication module 110 may include a wireless fidelity (Wi-Fi) module 111, a Bluetooth module 112, a broadband module 113, a short message service (SMS) module 114, and so on. As will be described, the communication module 110 may be configured to transmit visual information associated with a video stream from the mobile computing device 100 to one or more servers connected to the network 200.

The GPS module 115 may be used to enable the user to get directions from one location to another location. The GPS module 115 may also be used to enable generating the geographical information and associating the geographical information with images and frames of video streams. This process is typically referred to as geotagging. When the mobile computing device 100 is used to capture a video stream, the geographical information may be inserted into one or more the frames of the video stream. The geographical information may be inserted and stored with images, video streams, and text messages generated by the mobile computing device 100. The geographical information may be stored as metadata, and may include latitude and longitude coordinates. For example, the server system for the tagging and augmentation of geographically-specific locations can use a location of a building in an image by using the latitude and longitude coordinates associated or stored with that image and other distinctive features of the building to determine what objects are appearing in a video stream.

The video capturing module 120 may be configured to capture images or video streams. The video capturing module 120 may be associated with a video camera 121 and may enable a user to capture the images and/or the video streams. The video capturing module 120 may be associated with a direction sensor 122 to sense the direction that the video camera 121 is pointing to.

The display module 104 may be configured to display the images and/or the video streams captured by the video capturing module 120. For some embodiments, the display module 104 may be configured to display the images and/or the video streams that have been augmented with the augmented reality information. The display module 104 may be associated with a display screen 106.

The memory 130 may include internal memory and expansion memory. For example, the internal memory may include read-only memory (ROM) and random access memory (RAM), and the expansion memory may include flash memory. The memory 130 may be used to store an operating system (OS) and various other applications including, for example, productivity applications, entertainment applications, communication applications, image and/or video processing applications, user interface applications, etc. The processor 125 may be configured to execute instructions associated with the OS, network browsers, and the various applications. Some examples of the OS may include Android from Google, iOS from Apple, Windows Phone from Microsoft, and WebOS from Palm/HP, and so on. The network browsers may be used by the mobile computing device 100 to allow the user to access websites using the network 200.

The mobile computing device 100 may include an identity module 150 configured to provide the mobile computing device 100 a unique identity in a network. The identity module 150 may be a subscriber identity module (SIM). Although not shown in FIG. 1, the mobile computing device 100 may include a power source (e.g., a battery), a keyboard (although soft keyboard may be implemented), input/output interfaces (e.g., video, audio ports), external power connector, external memory connectors, an antenna, a speaker, etc.

Referring back to FIG. 2, the network environment illustrated in this example may be referred to as the client-server environment. The client-server relationship allows the operations of the mobile computing device 205A-205C to be triggered anywhere in the world and to augment any captured video stream with useful information enhancing the user's view of the real world. It should be noted that the number of mobile computing devices, servers, and databases illustrated in this example is for illustration purpose only and is not meant to be restrictive. It is within the scope of embodiments of the present disclosure that there may be many servers and databases worldwide to serve many more mobile computing devices.

The mobile computing devices 200A-200D may include features similar to the mobile computing device 100 described in FIG. 1. The servers 205A-205C may include communication modules and associated applications that allow them to be connected to the network 200 and to exchange information with the mobile computing devices 200A-200D. For example, a user using the mobile computing device 200A may interact with web pages that contain embedded applications, and then supply input to the query/fields and/or service presented by a user interface associated with the applications. The web pages may be served by the server 205A on the Hyper Text Markup Language (HTML) or wireless access protocol (WAP) enabled mobile computing device 205A or any equivalent thereof. The mobile computing device 205A may include browser software (e.g., Internet Explorer, Firefox) to access the web pages served by the server 205A.

Another Example Network Diagram

Figure 4:
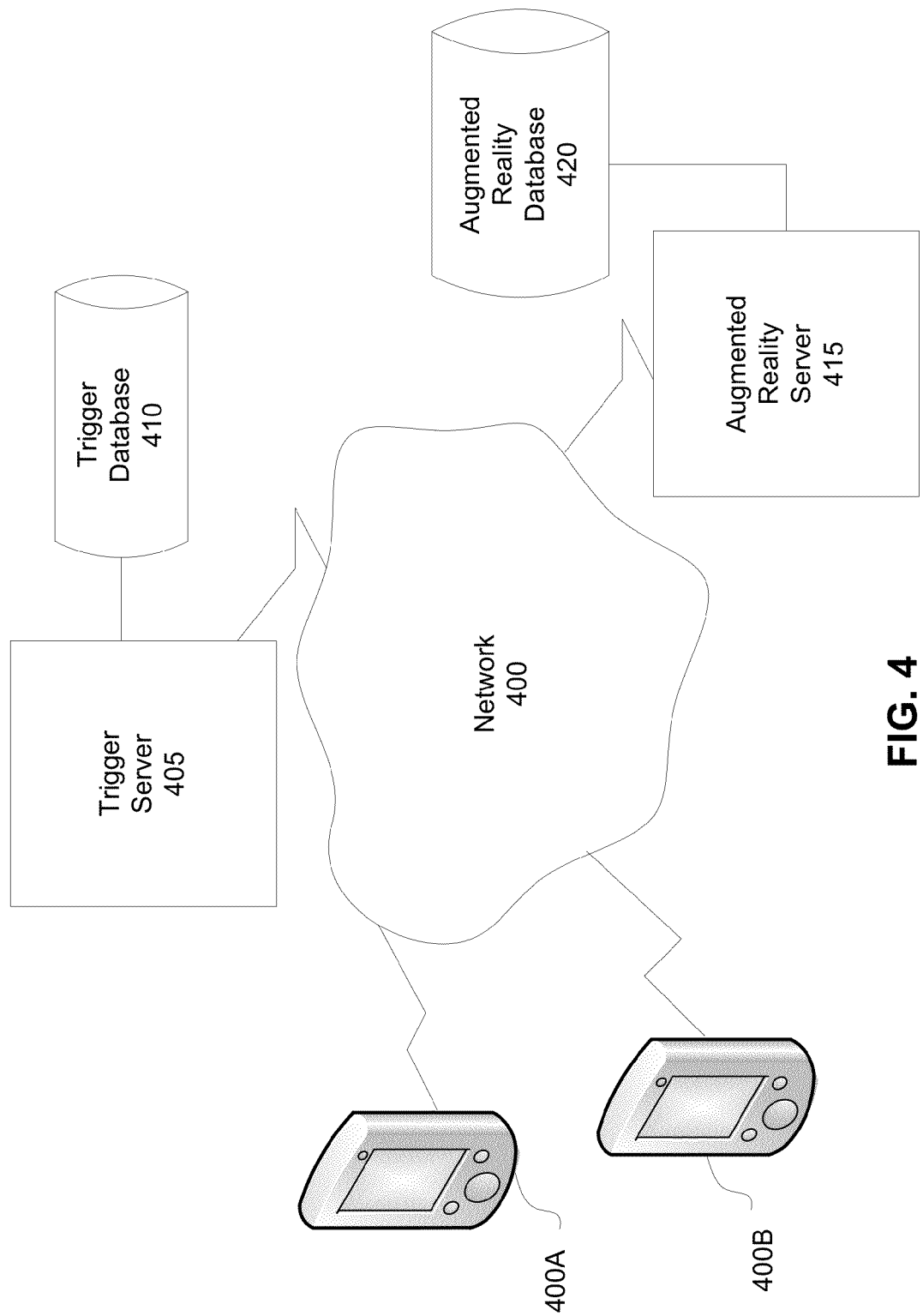
FIG. 4 illustrates a block diagram of an embodiment of another example network diagram with mirrored servers that may be used to divide and filter information received from the mobile computing devices to make the system respond to a plurality of instances of downloaded applications in real time, in accordance with some embodiments.

FIG. 4 illustrates a block diagram of an embodiment of another example network diagram with mirrored servers that may be used to divide and filter information received from the mobile computing devices to make the system respond to a plurality of instances of downloaded applications in real time. As illustrated in the example embodiment, network 400 may be connected to a trigger server 405 that is in communication with a trigger database. Various embodiments of the systems and methods described herein are capable of recognizing trigger items such as images, symbols and objects in the real world and understanding them. These trigger items can be stored in the trigger database 410 for retrieval by the trigger server 405 such that they are available over the network 400.

The network 400 is also connected to an augmented reality server 515 that is connected to an augmented reality database 420. The systems and methods described herein bring the physical and virtual worlds together. When the trigger server 505 recognizes a trigger items such as images, symbols and representations of objects in the real world stored in the trigger database 410 the trigger item can cause the augmented reality server 415 to then deliver relevant content including augmented reality overlays stored in the augmented reality database 420. As discussed, the augmented reality content may be superimposed on a view of the real world. For example, a user may view the real world, in real time, by looking at a video screen on a mobile handheld device 400A, 400B. Using a camera in the device the area around the user might be filmed and the images can be displayed on the screen of the mobile device 400A, 400B. The augmented reality overlays can then be superimposed on the view of the real world on the screen of the mobile device 400A, 400B. Note, the display screen of the device extends to glasses and visors on the head or face of the user, where the glasses and visors are connected to the mobile device 400A.

Block Flow Diagrams

Figure 5A:
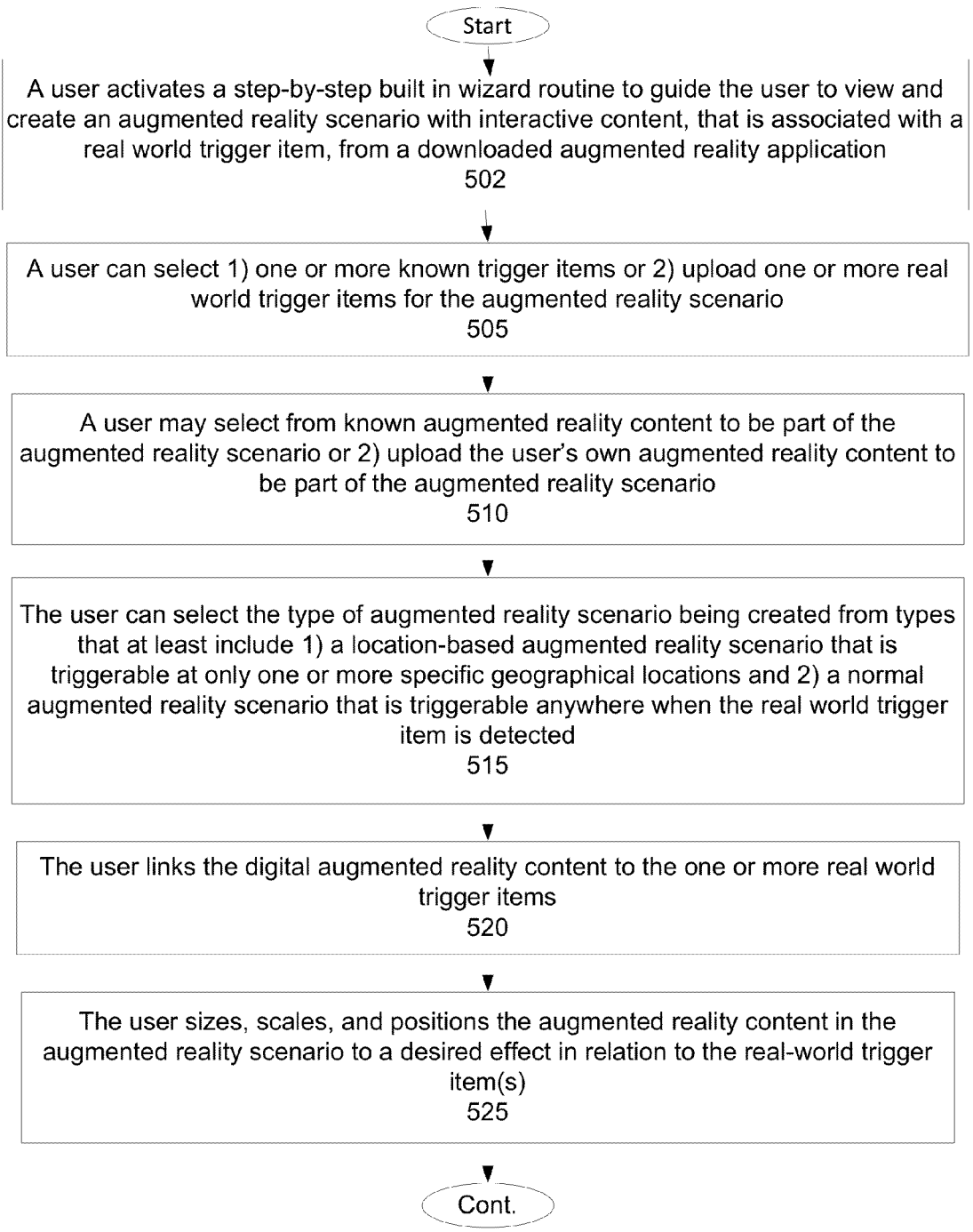
FIGS. 5A and 5B illustrate an example flow diagram of a user creating their own augmented reality scenarios.
Figure 5B:
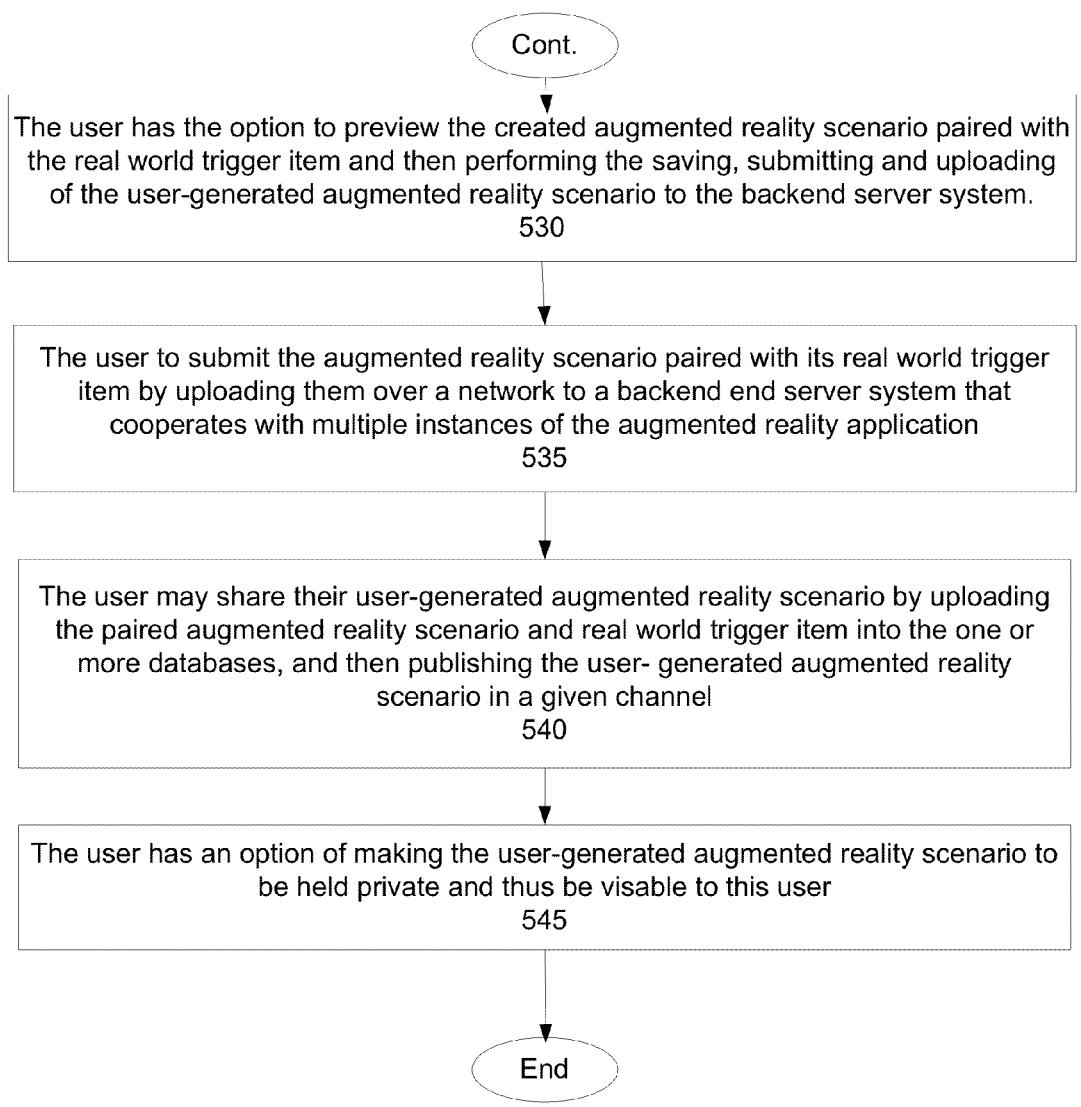

FIGS. 5A and 5B illustrate an example flow diagram of a user creating their own augmented reality scenarios. The steps that follow may be performed out of order where logically possible. Each user may create their own augmented reality scenario to tailor their experience. Each user may create their own augmented reality scenario and share those created augmented reality scenarios with others in the Augmented reality application community.

In step 502, a user activates a step-by-step built-in wizard routine to guide the user to view and create an augmented reality scenario with interactive content, which is associated with a real world trigger item, from a downloaded augmented reality application resident on the mobile computing device. For example, an augmented reality scenario can be created at mobile device by selecting the correct icon in the application resident on the mobile computing device. The user can use the step-by-step built-in Wizard/instructions to create augmented reality actions that appear when the user or the user's friends hover their smart phone over the real world trigger item. Thus, an icon within the augmented reality application may be activated/clicked on to invoke a step-by-step built-in wizard routine to guide a user through performing the operations to create the augmented reality scenario paired with the real world trigger item. The user clicks the 'Add augmented reality scenario' button to start the process to create their own augmented reality scenario.

In step 505, a user can select 1) one or more known trigger items or 2) upload one or more real world trigger items for the augmented reality scenario. The real world trigger item may be selected from any of 1) a target image and 2) a target object from stock images of real world images and objects that are already known and identified by the backend server system, or the user may select a custom real world trigger item from any of 1) a target image and 2) a target object image from any of 1) a source on the Internet and 2) a source file on the mobile computing device selected by the user such as from the my photo directory. When the user indicates to the application the user's desire to select a custom real world trigger item, then the augmented reality application displays an indication on the display screen that assists the user to choose a satisfactory angle and exposure of the target image or target object, and visually conveys the indication, such as a bar turns green, when the augmented reality application sees a satisfactory angle and exposure of the target image or target object that will work well as a trigger item. The augmented reality application then is configured to capture and store one or more satisfactory angles and exposures of the target image or target object and then upload those for trigger item processing in backend server system. When the user is prompted to choose a trigger item, the user may adjust the frame selector to choose a target image or object (i.e. real world trigger item) the user wants to associate with the augmented reality scenario. The real world trigger item may come from stock images of real world objects, images from a source on the web, or another source selected by the user such as from the my photo directory. A colored bar can provide feedback to the user regarding the suitability of the image for use as a real world trigger item. For example, the colored bar located at the bottom left of the screen will help the user to choose a good image, and turns green when it sees an image that will work well.

Note the user may capture an image on the screen of the mobile device by picking a flat image and then referencing a green bar for strength. The user may select between creating a regular augmented reality scenario that is visible anywhere or a location-based augmented reality scenario, which appears when a user is located in one significant geographical location. When the user is taking a picture of a building or other specific geographic location trigger item, then the user should generally make a location-based augmented reality scenario (See step 515). The user should set the slider in the bottom-right of the display screen to the location-based augmented reality scenario icon. The augmented reality application ensures that the GPS coordinates are coupled with that trigger item. When the user is taking a picture of a target image or target object that could be found anywhere, such as a magazine, or picture, then the user should make a regular augmented reality scenario and set the slider to the augmented reality scenario icon.

In step 510, a user may select from known augmented reality content to be part of the augmented reality scenario or 2) upload the user's own augmented reality content to be part of the augmented reality scenario. Many different electronic files may be linked to a real world trigger item. Examples include video file at a website, an image file or video file of something from your device, an Augmented reality application animation, links to a historical overview of the trigger item, or other augmented realty content source.

One example includes video. Video including transparency may be placed into the scene in full projected perspective, bringing the scene to life even as the phone and object moves, such as appearing to make a character in a painting come to life. Such video may also include interaction allowing a user to select a transition to a website. Videos may also extend beyond the trigger, so, for example, a wide movie trailer can play beyond the edges of a tall poster. Thus, a user can create augmented reality actions that appear when the user or the user's friends hover their smart phone over the real world trigger item.

Another example includes images. Any kind of image may be placed into the scene, for example to update a textbook image with a newer version. 3D Objects might also be used, such as full 3D objects may be rendered in real time into the scene. For example, a person can appear out of a news article and explain the news.

Games may also be executed as an augmented reality, with the game elements tied into the scene and kept in perspective as the viewing point moves. This allows objects in the scene to become aspects in the games.

The augmented reality content electronic file can then be given a name and be positioned over a target image/trigger item. The augmented reality content can then be added to the image of the real world trigger item to create an augmented reality scenario. For example, select an image, video, or animation from your Photos directory, or from the stock augmented reality content directory from augmented reality application, or, if the user prefers, download a video from the Internet or an image or animation from the web. The user contributions to the virtual reality world are virtually limitless. The amount of virtual reality content that can augment one or more trigger items found in the real world is almost limitless. The wizard then prompts the user to Click "Done", and this action links the augmented reality content to the real world trigger item (See step 520).

In step 515, the wizard also prompts the user to select the type of augmented reality scenario being created from types that at least include 1) a location-based augmented reality scenario that is triggerable at only one or more specific geographical locations and 2) a normal augmented reality scenario that is triggerable anywhere when the real world trigger item is detected via a slider bar. The user can create a special type of augmented reality scenario, a location-based augmented reality scenario. A location-based augmented reality scenario appears in specific geographical locations. These specific geographical locations are coupled to that trigger item.

In step 520, the user links the digital augmented reality content to the one or more real world trigger items. The user pairs the augmented reality scenario with the real world trigger item. When the one or more real world trigger items have been indicated as satisfactory for use and the augmented reality content has been added/selected the two may be linked. On the screen, of the smart mobile device, the wizard prompts the user to Click "Done" to link the augmented reality content to the one or more real world trigger items.

In step 525, the application prompts the user to size, scale, and position the augmented reality content in the augmented reality scenario to a desired effect in relation to the real-world trigger item. After the device processes the linking of the trigger items to augmented reality content, the application can then be presented for a view and be given a name. The augmented reality content may be manipulated on the mobile device 100. For example, a user might use their fingers to move, shrink, or rotate the augmented reality content to the position in which the user wants it to appear relative to the trigger item.

In step 530, the wizard prompts the user with the option to preview the created augmented reality scenario paired with the real world trigger item and then performing the saving, submitting and uploading of the user-generated augmented reality scenario to the backend server system. The Augmented reality scenario might then be saved and available for use.

In step 535, the wizard then prompts the user to submit the augmented reality scenario paired with its real world trigger item by uploading them over a network to a backend server system that cooperates with multiple instances of the augmented reality application, each augmented reality application resident on its own mobile computing device. The submitted augmented reality scenario paired with its real world trigger item is stored and indexed into one or more databases in the backend server system. The downloadable augmented reality application cooperates with the back end server to index and put the augmented reality scenario into a user's channel. The user-generated augmented reality scenario may be indexed and stored in one or more channels, interest groups, and any combination of the two in the one or more databases.

In step 540, the wizard prompts the creator of the augmented reality application to share their user-generated augmented reality scenario by uploading the paired augmented reality scenario and real world trigger item into the one or more databases, and then publishing the user-generated augmented reality scenario in a given channel. The publishing in a channel makes the user-generated augmented reality scenario visible for all the instances of the augmented reality application to view and potentially download.

In step 545, the wizard also presents an option of making the user-generated augmented reality scenario to be held private and thus be visible to this user only compared to the default published status for general viewing for all users.

Figure 6:
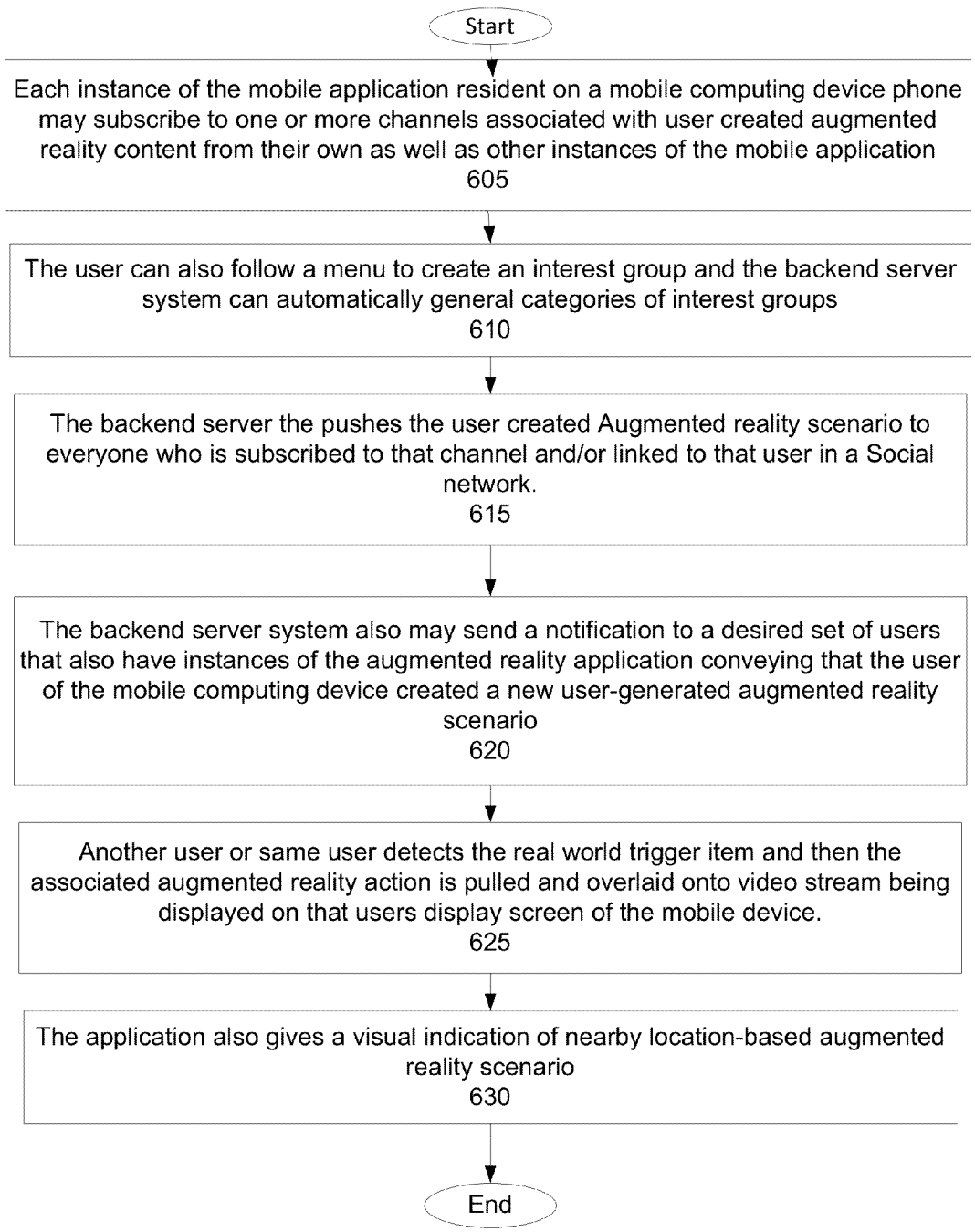
FIG. 6 illustrates an example flow diagram of a user publishing and interacting with augmented reality scenarios.

FIG. 6 illustrates an example flow diagram of a user publishing and interacting with augmented reality scenarios. The steps that follow may be performed out of order where logically possible.

In step 605, each instance of the mobile application resident on a mobile computing device phone may subscribe to one or more channels associated with user created augmented reality content from their own as well as other instances of the mobile application. When a camera of a smart phone detects the real world trigger item the associated augmented reality action for the channel associated with the first smart phone may be pulled and overlaid onto video stream being displayed on a display screen if the augmented reality scenario is not already stored in the local cache.

Channels allow users to get together and create interest groups around their created augmented reality scenarios and favorite third party augmented reality scenarios. The user can create and share their own personalized channels and subscribe to other people's channels to view their augmented reality scenarios. Subscribe to a channel to activate the augmented reality scenarios from that channel and to receive real-time updates of new augmented reality scenarios. When the user creates either normal or location-based augmented reality scenarios, then the user can put them into their own channels. Anyone can then subscribe to those channels and see the augmented reality scenarios that the user placed in them. Augmented reality scenario may be made "private," if desired by the user. In an embodiment, a padlock icon is highlighted to indicate that a channel is private. The augmented reality scenarios that the user adds will only be visible to other instances of the downloadable augmented reality application. The user can see a list of them in the My Augmented Reality Scenarios tab of the Channels page. If the user wants to share an augmented reality scenario with their friends then click on it in the list.

In step 610, the user can follow a menu to create an interest group and the backend server system can automatically general categories of interest groups. The interest group created and published by the backend server is around a given category of created augmented reality scenarios and selected third party augmented reality scenarios. Those augmented reality scenarios are shared to all those instances of the downloadable augmented reality application, where either users subscribe to that interest group or a user's behavior including browser history, other downloaded applications on the mobile device indicates the user would be interested in that category of created augmented reality scenarios.

In step 615, the backend server pushes the user created augmented reality scenario to everyone who is subscribed to that channel or linked to that user in a Social network. The backend server system periodically pushes the user-generated augmented reality scenario published and stored in the channel to all of the instances of the augmented reality application associated with users that subscribe to that channel as long as the user-generated augmented reality scenario is not designated as private. The backend server also pushes the user-created augmented reality scenario to everyone who is linked to that user in a social network and also has an instance of the augmented reality application resident on their mobile computing device. The downloadable augmented reality application is configured to cooperate with a transmitter in the communication module of the mobile computing device to transmit the user-generated augmented reality scenarios to a backend server located over a wide area network such that the overlays can be added to a user's channel and shared with other users over a social networking site.

In step 620, the backend server system also sends at least one of a text message, e-mail, or notification on a social web site to a desired set of users, such as this user's friends on a social network, of the instances of the augmented reality application conveying that the user of the mobile computing device created a new user-generated augmented reality scenario. The user can then send it via email or SMS, or even post it on Twitter® or Facebook®. Augmented reality scenarios in a user's channel may be shared within one or more on-line social networks. A user may select to tell his or her friends via email, SMS, Facebook, or Twitter about augmented reality scenarios and channels that the user enjoys and/or has created.

In step 625, another user or the same user detects the real world trigger item, and the associated augmented reality content associated with the real world trigger item is identified and overlaid onto the video stream being displayed on that user's mobile device (e.g., on the display screen). The augmented reality scenario is configured to appear when a trigger item detection module in the augmented reality application detects the real world trigger item from one or more frames of a video captured by a video camera of the mobile computing device, and after the detection of the real world trigger item, an augmentation engine of the augmented reality application is configured to overlay the augmented reality content onto frames of the video on the display.

Sharing Augmented Reality Scenarios

In an embodiment, to use a shared augmented reality scenario, the user needs three things: a smart phone with the augmented reality application installed, an augmented reality application URL (e.g., from a friend), and an image to point at. Once the user has the phone, the application, and the URL, the user should make sure the augmented reality application is running, go to the smart phone's web browser or email, and then click on the URL. The augmented reality application should tell the user that it is adding the augmented reality scenario to a local database. When it is ready, the user can point the phone at the picture, and it will come to life. If the user was not told what picture to point the smart phone at, then the user can point the camera around the location and the augmented reality application will automatically detect the trigger items in view.

In step 630, the application gives a visual indication of nearby location-based augmented reality scenarios. This can occur when items linked to location-based augmented reality scenarios are nearby. These can appear, for example, as thumbnails at the bottom of the display screen. An indication of how far away the items are located may also be provided.

The community of users of mobile computing devices can each create augmented reality scenarios, which can then be uploaded over a wide area network to the server system in order for the server system to publish and share the augmented reality scenarios with one or more users of the mobile computing devices in the community. The created augmented reality scenarios can be played on the mobile computing device and used by either exclusively the user themselves or by other members of the community.

Intelligent Data Operating Layer (IDOL) Server

Figure 7:
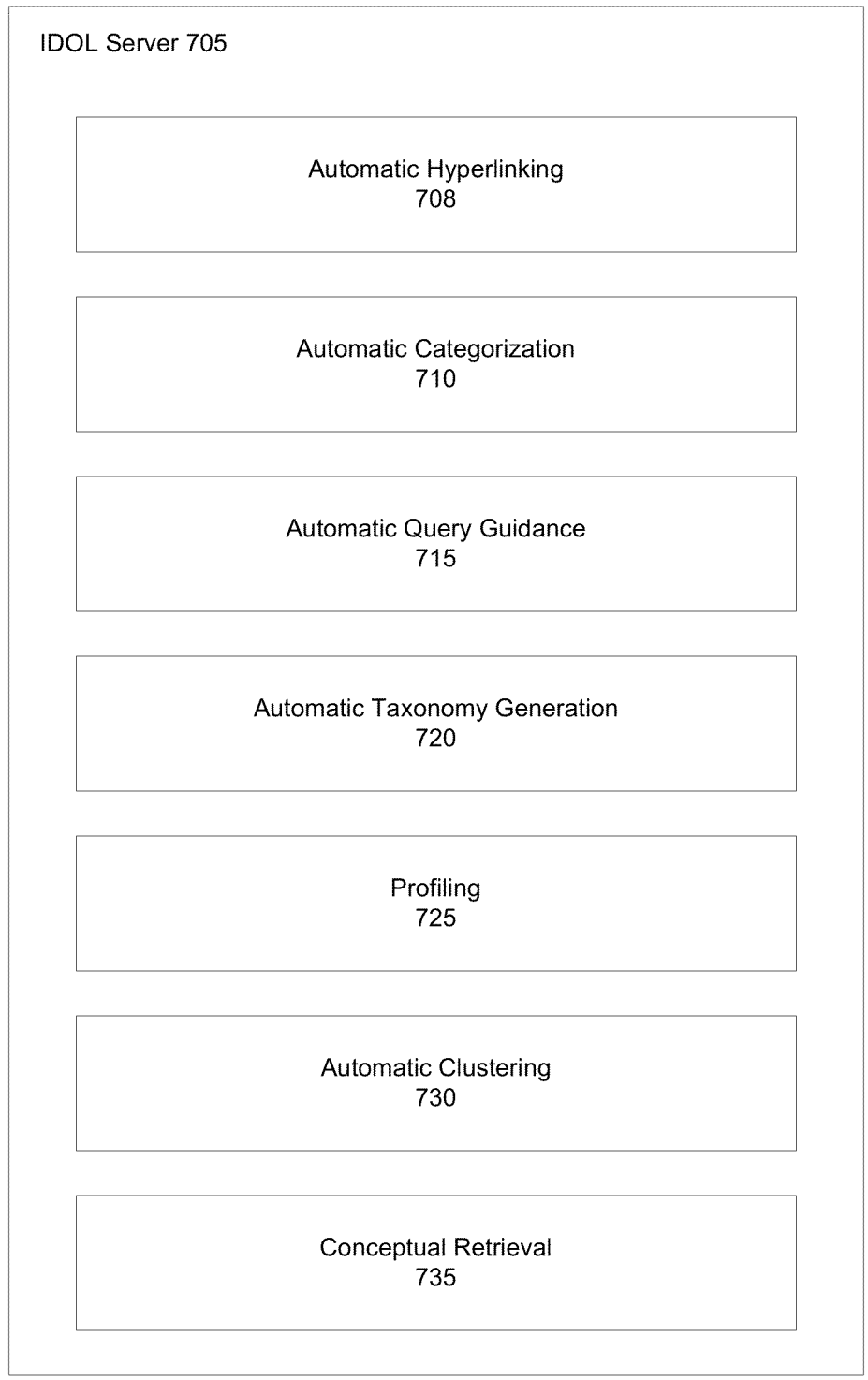
FIG. 7 illustrates an example block diagram of modules of an IDOL server, in accordance with some embodiments.

FIG. 7 illustrates an example block diagram of some modules of an IDOL server, in accordance with some embodiments. IDOL server 705 may include automatic hyperlinking module 708, automatic categorization module 710, automatic query guidance module 715, automatic taxonomy generation module 720, profiling module 725, automatic clustering module 730, and conceptual retrieval module 735. The automatic hyperlinking module 708 is configured to allow manual and fully automatic linking between related pieces of information. The hyperlinks are generated in real-time at the moment the document is viewed. The automatic categorization module 710 is configured to allow deriving precise categories through concepts found within unstructured text, ensuring that all data is classified in the correct context.

The IDOL server collects indexed data from connectors from various sources to train the engines and stores it in its proprietary structure, optimized for fast processing and retrieval of data. As the information processing layer, IDOL forms a conceptual and contextual understanding of all content in an enterprise, automatically analyzing any piece of information from over thousands of different content formats and even people's interests. Hundreds of operations can be performed on digital content by IDOL, including hyperlinking, agents, summarization, taxonomy generation, clustering, deduction, profiling, alerting, and retrieval. The IDOL Server has the knowledge base to interrelate the feature pattern transmitted by the video processing module 135. An example of the some of the modules included in the IDOL server is illustrated in FIG. 7. As discussed earlier, the IDOL server may be used as part of the backend server system.

The IDOL sever may be associated with an IDOL connector which is capable of connecting to hundreds of content repositories and supporting over thousands of file formats. This provides the ability to aggregate and index any form of structured, semi-structured and unstructured data into a single index, regardless of where the file resides. The extensive set of connectors enables a single point of search for all enterprise information (including rich media), saving organizations much time and money. With access to virtually every piece of content, IDOL provides a 360-degree view of an organization's data assets.

The IDOL servers implement a conceptual technology is context-aware and uses deep audio and video indexing techniques to find the most relevant products, including music, games, and videos. The IDOL servers categorize content automatically to offer intuitive navigation without manual input. The IDOL servers also generate links to conceptually similar content without the user having to search. The IDOL servers may be trained with free-text descriptions and sample images such as a snapshot of a product. A business console presents live metrics on query patterns, popularity, and click-through, allowing the operators to configure the environment, set-up promotions and adjust relevance in response to changing demand.

The automatic query guidance module 715 is configured to provide query suggestions to find most relevant information. It identifies the different meanings of a term by dynamically clustering the results into their most relevant groupings. The automatic taxonomy generation module 720 is configured to automatically generate taxonomies and instantly organizes the data into a familiar child/parent taxonomical structure. It identifies names and creates each node based on an understanding of the concepts with the data set as a whole. The profiling module 725 is configured to accurately understand individual's interests based on their browsing, content consumption, and content contribution. It generates a multifaceted conceptual profile of each user based on both explicit and implicit profiles.

The automatic clustering module 730 is configured to help analyze large sets of documents and user profiles and automatically identify inherent themes or information clusters. It even cluster unstructured content exchanged in emails, telephone conversations and instant messages. The conceptual retrieval module 735 is configured to recognize patterns using a scalable technology that recognizes concepts and find information based on words that may not be located in the documents. It should be noted that the IDOL server 705 may also include other modules and features that enable it to work with the mobile computing device 100 to generate the augmented video stream as described herein. As described above, one or more of the modules of the IDOL server 705 may be used to implement the functionalities of the object recognition engine 305, the augmentation engine 375, etc.

Computer System

Figure 8:
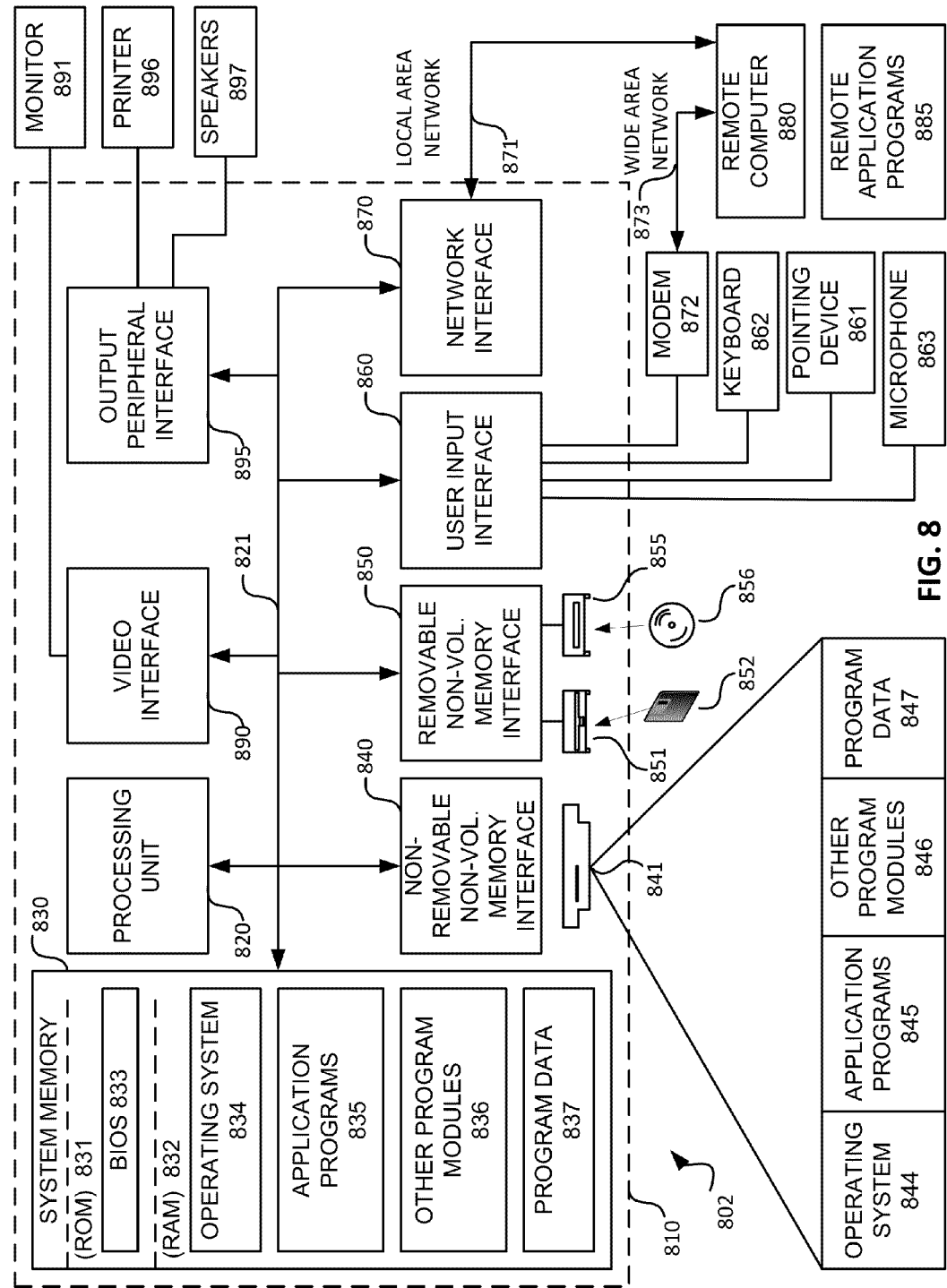
FIG. 8 illustrates another example computer system that may be used to implement an augmented video stream, in accordance with some embodiments.

FIG. 8 illustrates an example computer system that may be used to implement an augmented video stream, in accordance with some embodiments. Computing environment 802 is only one example of a suitable computing environment and is not intended to suggest any limitations as to the scope of use or functionality of the embodiments of the present disclosure. Neither should the computing environment 802 be interpreted as having any dependency or requirement relating to any one or combination of components illustrated in FIG. 8.

Embodiments of the disclosure may be operational with general purpose or special purpose computer systems or configurations. Examples of well-known computer systems that may be used include, but are not limited to, personal computers, servers, hand-held or laptop devices, Tablets, Smart phones, Netbooks, multiprocessor systems, microprocessor-based systems, set top boxes, programmable consumer electronics, network PCs, minicomputers, mainframe computers, distributed computing environments that include any of the above systems or devices, and the like.

Embodiments of the present disclosure may be described in the general context of computer-executable instructions, such as program modules, routines, or engines, being executed by a computer system. Generally, program modules include routines, programs, databases, objects, components, data structures, etc. that performs particular tasks or implement particular abstract data types. Those skilled in the art can implement the description and/or figures herein as computer-executable instructions, which can be embodied on any form of computer readable media discussed below.

Embodiments of the present disclosure may also be practiced in distributed computing environments where tasks are performed by remote processing devices that are linked through a communications network. In a distributed computing environment, program modules may be located in both local and remote computer storage media including memory storage devices.

Referring to FIG. 8, the computing environment 802 includes a general-purpose computer system 810. Components of the computer system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

Computer system 810 typically includes a variety of non-transitory computer readable media. Computer readable media can be any available media that can be accessed by computer system 810 and includes both volatile and nonvolatile media, removable and non-removable media. By way of example, and not limitation, computer readable mediums uses include storage of information such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer system 810. Communication media typically embodies computer readable instructions, data structures, program modules or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer system 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

A participant may enter commands and information into the computer system 810 through input devices such as a keyboard 862, a microphone 863, and a pointing device 861, such as a mouse, trackball or touch pad. Other input devices (not shown) may include a joystick, game pad, scanner, or the like. These and other input devices are often connected to the processing unit 820 through a user input interface 860 that is coupled with the system bus 821, but may be connected by other interface and bus structures, such as a parallel port, game port or a universal serial bus (USB). A monitor 891 or other type of display device is also connected to the system bus 121 via an interface, such as a video interface 890. In addition to the monitor, computers may also include other peripheral output devices such as speakers 897 and printer 896, which may be connected through an output peripheral interface 890.

The computer system 810 may operate in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer system 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer system 810 is connected to the LAN 871 through a network interface or adapter 870. When used in a WAN networking environment, the computer system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, program modules depicted relative to the computer system 810, or portions thereof, may be stored in a remote memory storage device. By way of example, and not limitation, FIG. 8 illustrates remote application programs 885 as residing on remote computer 880. It will be appreciated that the network connections shown are exemplary and other means of establishing a communications link between the computers may be used.

Another device that may be coupled with the system bus 821 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 872 may employ a Wireless Application Protocol (WAP) to establish a wireless communication channel. The communication module 872 may implement a wireless networking standard such as the Institute of Electrical and Electronics Engineers (IEEE) 802.11 standard, IEEE std. 802.11-1999, published by IEEE in 1999.

Server Mirroring and Distributed Processing

Figure 9:
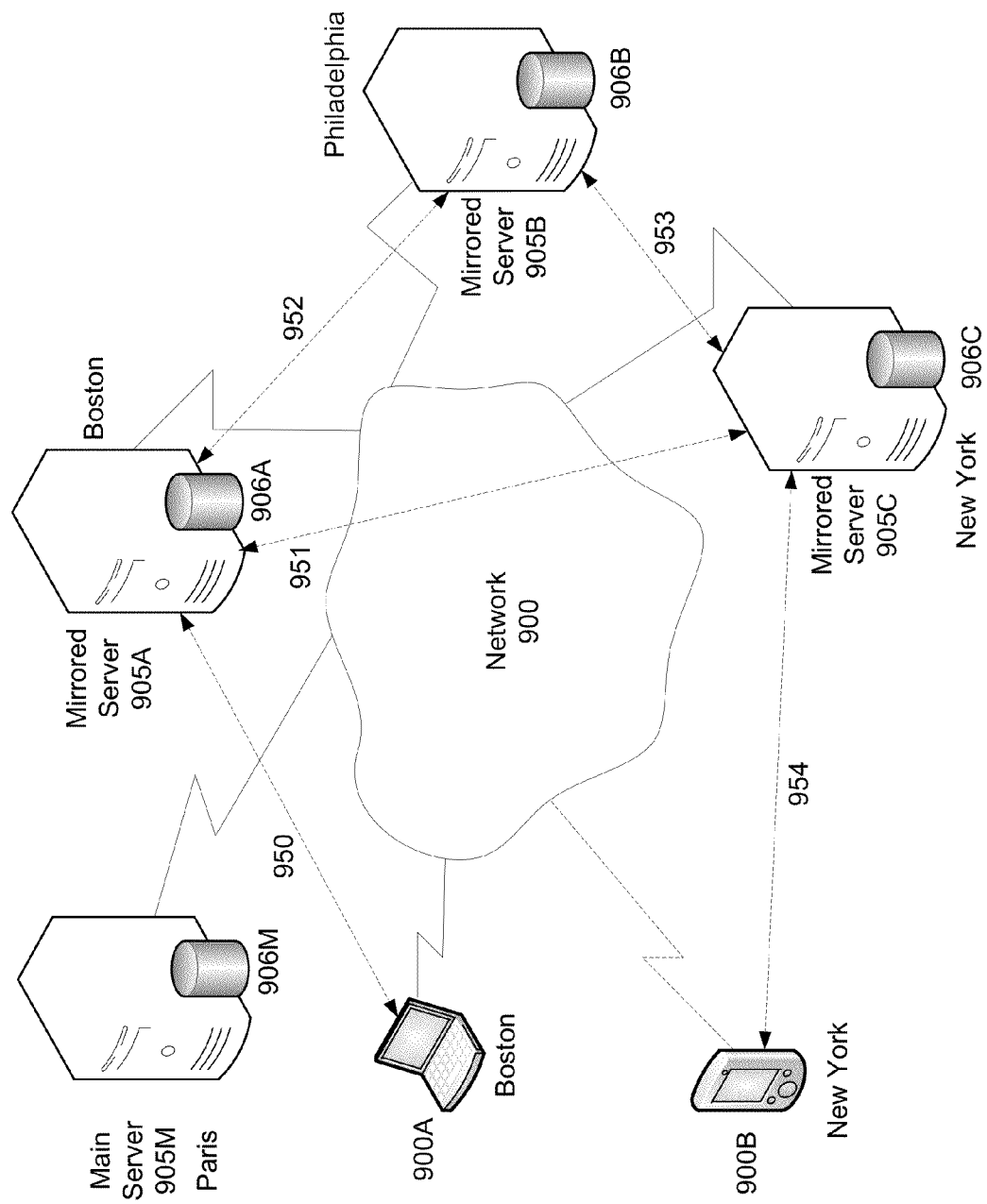
FIG. 9 illustrates an example of a network diagram with mirrored servers that may be used to filter information received from mobile computing devices, in accordance with some embodiments.

FIG. 9 illustrates an example of a network diagram with mirrored server sites that may be used to filter information received from the mobile computing devices, in accordance with some embodiments. In this example, each server site is represented by one server for simplicity. However, it should be understood that each server site may include multiple servers working together collaboratively in a distributive manner as described above. Servers 905M, 905A, 905B, and 905C connected to the network 900 may be configured as IDOL servers. The IDOL servers may include a main IDOL server 905M and multiple mirrored IDOL servers 905A-905C. The main IDOL server 905M may mirror its information onto the mirrored IDOL servers 905A-905C. The mirroring may include mirroring the content of the main IDOL server database 906M into the mirrored IDOL sever databases 906A-906C. For example, the object database 300, the facial recognition database 342, and the augment information database 350 may be mirrored across all of the mirrored IDOL servers 905A-905C. The main IDOL server 905M and the mirrored IDOL servers 905A-905C may be located or distributed in various geographical locations to serve the mobile computing devices in these areas. For example, the main IDOL server 905M may be located in Paris, France, the mirrored IDOL server 905A may be located in Boston, Mass., 905B in Philadelphia, Pa., and 905C in New York, N.Y. As discussed, the mirroring of a server in one location with another server in another location may be understood as the mirroring of a server site with all of its servers together with associated hardware and content.

For some embodiments, a set of two or more IDOL servers may work together in a cooperative and distributive manner to do the work of the object recognition engine described in FIG. 3. For example, there may be a set of two or more IDOL servers in Boston configured to perform the operations of the object recognition engine. Similarly, a set of two or more IDOL servers may work together in the same cooperative and distributive manner to do the work of the, facial recognition engine or the augmentation engine. This allows the functionalities of the object recognition engine, the facial recognition engine, and the augmentation engine amongst the set of servers to be performed in a faster manner.

The distribution of servers within a given location or sister helps to improve the identification and augmentation response time. The IDOL server set being duplicated with the same content and mirrored across the Internet to distribute this load to multiple identical sites to increase both response time and handle the capacity of the queries by those mobile computing devices.

For some embodiments, the downloaded application may include a coded block to call up and establish a persistent secure communication channel with a nearest non-overloaded mirrored site of the main IDOL server when the mobile computing device 410A, 410B is used to capture a video stream. For example, the mobile computing device 900A may be connected with the IDOL server 905A via communication channel 950 because both are located in Boston. However, when the IDOL server 905A is overloaded, the mobile computing device 900A may be connected with the IDOL server 905C in New York because it may not be overloaded even though the IDOL server 905C may be further from the mobile computing device 900A than the IDOL server 905A.

For some embodiments, a set of IDOL servers may be used to filter the information received from the mobile computing devices. A hierarchical set of filters may be spread linearly across the set of IDOL servers. These IDOL servers may work together in collaboration to process the transmitted object and/or person visual information to determine or recognize what the object or who the person is. For example, when the mobile computing device 900A establishes the communication channel 950 with the IDOL server 905A, the IDOL servers 905A-905C may work together to process the information received from the mobile computing device 900A. This collaboration is illustrated by the communication channel 951 between the IDOL server 905A and 905C, and the communication channel 952 between the IDOL server 905A and 905B. Similarly, when the mobile computing device 900B establishes communication channel 954 with the IDOL server 905C, the IDOL servers 905C, 905B and 905A may work together to process the information received from the mobile computing device 900B. This collaboration is illustrated by the communication channel 951 between the IDOL server 905C and 905A, and the communication channel 953 between the IDOL server 905C and 905B.

Each server in the set of servers applies filters to eliminate the pattern of features received from the mobile computing device 410A, 410B as possible matches to feature sets of known objects in the object database. Entire categories of possible matching objects can be eliminated simultaneously, while subsets even within a single category of possible matching objects can be simultaneously solved for on different servers. Each server may hierarchically rule out potentially known images on each machine to narrow down the hierarchical branch and leaf path to a match or no match for the analyzed object of interest. In addition, the augmentation engine and facial recognition engine both may have their functionality distributed out amongst a set of two or more servers at the site.

The mobile computing device 410A, 410B has built-in Wi-Fi circuitry, and the video stream is transmitted to an IDOL server on the Internet. The IDOL server set contains an object recognition engine that can be distributed across the IDOL server set, IDOL databases, and an augmentation engine as well. The object recognition engine distributed across the IDOL server set applies a hierarchical set of filters to the transmitted identified points of interest and their associated major within each frame of a video stream to determine what that one or more potential trigger item are within that frame. Since this is a video feed of a series of closely related frames both in time and in approximate location, the pattern of identified major features of potential trigger item within each frame of a video stream helps to narrow down the matching known object stored in the object database.

The collaboration among the IDOL servers may help speed up the recognition process. For example, each of the IDOL servers may apply filters to eliminate certain pattern of features as possible matches to features of known objects stored in the object database. Entire categories of objects may be eliminated simultaneously, while subsets even within a single category of objects may be simultaneously identified as potential matching objects by the collaborating IDOL servers. Each IDOL server may hierarchically rule out potential known objects to narrow down the hierarchical branch and leaf path to determine whether there is a match.

For some embodiments, each of the IDOL servers may match the pattern of the visually distinctive features of the potential trigger item in the frame to the known objects in the object database. The geometric shape of the features of the point of interest X-Y coordinates may come across to a human like a dot-to-dot connection illustration. When the X-Y coordinates of the dots on the grid of the paper are connected in the proper sequence, recognizing the image/object associated with those dots on the piece of paper is a simple task. This may include comparing the dot-to-dot type geometric shapes transmitted features along with their distinctive colors, recognized text, numbers and symbols, geographical information, direction information relative to the camera to the feature sets stored in the object database. The dot-to-dot type geometric shapes can be subset into distinctive triangles, pyramids, rectangles, cubes, circles and cylinders, etc., each with its own associated distinctive colors or patterns, to aid in the identification and recognition. Each of the IDOL servers, on a hierarchical basis, may map the collection of feature points about the potential trigger item to a stored pattern of feature points for known objects to match what is in the frames to the known object.

For some embodiments, the video processing module may continuously transmit the identified features of the potential trigger item in the frames of the captured video stream while the object recognition engine (distributed over a large amount of IDOL servers) and augmentation engine transmits back the augmented reality information to augment identified images/objects in the captured frames of the video file stored in a memory of the mobile computing device 410A, 410B when that identified object is being shown on the display in near real time (e.g., less than 5 seconds).

As discussed, the server has a set of one or more databases to store a scalable database of visual information on locations such as buildings, and structures, in order to perform subsequent matching of a visual data stream to determine the building or structure that is being viewed. The server-client system addresses the problem of determining the exact location of a mobile user, and to determine exactly what the user is looking at, at any point, by matching it against a database of characteristics associated with those visual images. The system gives the ability to construct a scalable solution to the problem to identify location, regardless of position and with minimal training.

The system with the server and a set of one or more databases (e.g., object database, facial recognition database, augment information database, user profile database) is trained on a set of views of the world and the models derived are stored for future retrieval. The combination of geographical information and visual characteristics allows a faster matching. Following this, the mobile computing device can be deployed to collect geospatial information and a video data stream from the camera and feed it back to the system. This is used to pinpoint the objects or locations within view and augment the video stream with additional visual or audiovisual objects or images.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, Java, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

The present disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled with a computer system bus. The augmented reality application as well as portions of the backend server system consist of electronic circuits, software instructions, electronic circuits cooperating with software instructions, and any combination of the three, where any portions of the augmented reality application and/or the backend server system that are implemented in software are stored on non-transitory computer readable medium, which stores instructions in an executable format by a processor.

The algorithms and displays presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description below.

In the following description of exemplary embodiments, reference is made to the accompanying drawings that form a part hereof, and in which it is shown by way of illustration specific embodiments in which the disclosure can be practiced. Also, it should be appreciated that one or more structural features described in one embodiment could be implemented in a different embodiment, even if not specifically mentioned as being a feature thereof.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims. For example, specific examples are provided for shapes and materials; however, embodiments include those variations obvious to a person skilled in the art, such as changing a shape or combining materials together. Further, while some specific embodiments of the disclosure have been shown the disclosure is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. A processor may be a central processing unit, a multiple core and multiple threaded processor, a digital signal processor, and other similar component configured to interpret and execute instructions. The disclosure is to be understood as not limited by the specific embodiments described herein, but only by scope of the appended claims.

What is claimed is:

1. A method for generating augmented reality scenarios, comprising:
   receiving, on a mobile computing device, a notification indicating a published augmented reality (AR) scenario proximate to a current location of the mobile computing device, the published AR scenario showing a matching AR item with a real world item;
   initiating, on the mobile computing device, an AR application that matches data corresponding to a plurality of real-world trigger items with a plurality of AR items in a memory index;
   monitoring, using a camera of the mobile computing device, a video stream from the camera;
   identifying the real-world item, corresponding to the published AR scenario, in the video stream;
   comparing features of the real-world item to the data corresponding to the plurality of real-world trigger items in the memory index to determine whether the real-world item corresponds to one of the plurality of real-world trigger items;

in response to determining that the real-world item corresponds to a respective one of the plurality of real-world trigger items, selecting the matching AR item from the plurality of AR items, the matching AR item being associated with the respective real-world trigger item in the memory index; and generating the published AR scenario on a display of the mobile computing device by superimposing the matching AR item onto the video stream;

wherein the notification is received based on a user of the mobile computing device being subscribed to an interest group that enables subscribers of the interest group to create and share AR scenarios.

2. The method of claim 1, wherein the matching AR item comprises at least one of a 3-dimensional (3D) object, video content associated with the real-world item, or a uniform resource locator (URL) link to a website associated with the real-world item.

3. The method of claim 1, further comprising:
while generating the published AR scenario, sizing, scaling, and positioning the matching AR item in the video stream in relation to a size, scale, and position of the real-world item in the video stream.

4. The method of claim 1, wherein the matching AR item comprises information related to the real-world item.

5. The method of claim 1, wherein comparing features of the real-world item to the data corresponding to the plurality of real-world trigger items comprises breaking the real-world item down into dot-to-dot X-Y coordinates and performing a hierarchical filtering operation of the plurality of real-world trigger items in the memory index.

6. The method of claim 1, wherein each of the plurality of real-world trigger items are stored in the memory index with metadata comprising location coordinates, and wherein comparing features of the real-world item to the data corresponding to the plurality of real-world trigger items comprises determining the current location of the mobile computing device and comparing the current location to the location coordinates for the plurality of real-world trigger items in the memory index.

7. A non-transitory computer-readable medium storing instructions that, when executed by a processor of a mobile computing device, cause the mobile computing device to:
receive a notification indicating a published augmented reality (AR) scenario proximate to a current location of the mobile computing device, the published AR scenario showing a matching AR item with a real world item;
initiate an AR application that matches data corresponding to a plurality of real-world trigger items with a plurality of AR items in a memory index;
monitor, using a camera of the mobile computing device, a video stream from the camera;
identify the real-world item, corresponding to the published AR scenario, in the video stream;
compare features of the real-world item to the data corresponding to the plurality of real-world trigger items in the memory index to determine whether the real-world item corresponds to one of the plurality of real-world trigger items;
in response to determining that the real-world item corresponds to a respective one of the plurality of real-world trigger items, select the matching AR item from the plurality of AR items, the matching AR item being associated with the respective real-world trigger item in the memory index; and
generate the published AR scenario on a display of the mobile computing device by superimposing the matching AR item onto the video stream;
wherein the notification is received based on a user of the mobile computing device being subscribed to an interest group that enables subscribers of the interest group to create and share AR scenarios.

8. The non-transitory computer-readable medium of claim 7, wherein the matching AR item comprises at least one of a 3-dimensional (3D) object, video content associated with the real-world item, or a uniform resource locator (URL) link to a website associated with the real-world item.

9. The non-transitory computer-readable medium of claim 7, wherein the executed instructions further cause the mobile computing device to:
while generating the published AR scenario, size, scale, and position the matching AR item in the video stream in relation to a size, scale, and position of the real world item in the video stream.

10. The non-transitory computer-readable medium of claim 7, wherein the matching AR item comprises information related to the real world item.

11. The non-transitory computer-readable medium of claim 7, wherein comparing features of the real-world item to the data corresponding to the plurality of real-world trigger items comprises breaking the real-world item down into dot-to-dot X-Y coordinates and performing a hierarchical filtering operation of the plurality of real-world trigger items in the memory index.

12. The non-transitory computer-readable medium of claim 7, wherein each of the plurality of real-world trigger items are stored in the memory index with metadata comprising location coordinates, and wherein comparing features of the real-world item to the data corresponding to the plurality of real-world trigger items comprises determining the current location of the mobile computing device and comparing the current location to the location coordinates for the plurality of real-world trigger items in the memory index.

13. A mobile computing device, comprising:
a camera;
a display;
one or more memory resources storing instructions; and
a processor, coupled to the camera, the display, and the one or more memory resources, to execute the instructions, causing the mobile computing device to:
receive a notification indicating a published augmented reality (AR) scenario proximate to a current location of the mobile computing device;
initiate an AR application that matches data corresponding to a plurality of real-world trigger items with a plurality of AR items in a memory index;
monitor, using the camera, a video stream from the camera;
identify the real-world item, corresponding to the published AR scenario, in the video stream;
compare features of the real-world item to the data corresponding to the plurality of real-world trigger items in the memory index to determine whether the real-world item corresponds to one of the plurality of real-world trigger items;
in response to determining that the real-world item corresponds to a respective one of the plurality of real-world trigger items, select the matching AR item from the plurality of AR items, the matching AR item being associated with the respective real-world trigger item; and generate the published AR scenario on the display by superimposing the matching AR item onto the video stream;

wherein the notification is received based on a user of the mobile computing device being subscribed to an interest group that enables subscribers of the interest group to create and share AR scenarios.

14. The mobile computing device of claim 13, wherein the matching AR item comprises at least one of a 3-dimensional (3D) object, video content associated with the real-world item, or a uniform resource locator (URL link to a website associated with the real-world item.

15. The mobile computing device of claim 13, wherein the executed instructions further cause the mobile computing device to:

while generating the published AR scenario, size, scale, and position the matching AR item in the video stream in relation to a size, scale, and position of the real-world item in the video stream.

16. The mobile computing device of claim 13, wherein the matching AR item comprises information related to the real-world item.

17. The mobile computing device of claim 13, wherein comparing features of the real-world item to the data corresponding to the plurality of real-world trigger items comprises breaking the real-world item down into dot-to-dot X-Y coordinates and performing a hierarchical filtering operation of the plurality of real-world trigger items in the memory index.

* * * * *